US011441913B2

(12) United States Patent
Nagy et al.

(10) Patent No.: US 11,441,913 B2
(45) Date of Patent: Sep. 13, 2022

(54) AUTONOMOUS VEHICLE WAYPOINT ROUTING

(71) Applicant: UATC, LLC, San Francisco, CA (US)

(72) Inventors: Bryan John Nagy, Allison Park, PA (US); Xiaodong Zhang, Pittsburgh, PA (US); Brett Bavar, Pittsburgh, PA (US); Misna Sameer, Pittsburgh, PA (US)

(73) Assignee: UATC, LLC, San Francisco, CA (US)

( * ) Notice: Subject to any disclaimer, the term of this patent is extended or adjusted under 35 U.S.C. 154(b) by 804 days.

(21) Appl. No.: 16/173,633

(22) Filed: Oct. 29, 2018

(65) Prior Publication Data

US 2020/0056895 A1 Feb. 20, 2020

Related U.S. Application Data

(60) Provisional application No. 62/719,982, filed on Aug. 20, 2018.

(51) Int. Cl.
  *G01C 21/34* (2006.01)
  *G05D 1/02* (2020.01)
  *G05D 1/00* (2006.01)

(52) U.S. Cl.
  CPC ....... *G01C 21/343* (2013.01); *G01C 21/3453* (2013.01); *G05D 1/0088* (2013.01); *G05D 1/0221* (2013.01); *G05D 2201/0213* (2013.01)

(58) Field of Classification Search
  CPC .............. G01C 21/343; G01C 21/3453; G05D 1/0088; G05D 1/0221; G05D 2201/0213
  USPC .............. 701/23, 27, 25, 410, 532; 705/338; 706/12; 340/994, 995.19, 2.23
  See application file for complete search history.

(56) References Cited

U.S. PATENT DOCUMENTS

| | | | |
|---|---|---|---|
| 10,401,852 B2 * | 9/2019 | Levinson | G01S 17/87 |
| 10,956,855 B1 * | 3/2021 | Coughran | G06N 5/04 |
| 2005/0216181 A1 * | 9/2005 | Estkowski | G05D 1/0212 |
| | | | 701/411 |
| 2013/0096815 A1 * | 4/2013 | Mason | G08G 1/20 |
| | | | 701/400 |
| 2018/0341895 A1 * | 11/2018 | Kislovskiy | G06Q 10/04 |
| 2020/0011690 A1 * | 1/2020 | Becker | G01C 21/3679 |

\* cited by examiner

*Primary Examiner* — Elaine Gort
*Assistant Examiner* — Ellis B. Ramirez
(74) *Attorney, Agent, or Firm* — Schwegman Lundberg & Woessner, P.A.

(57) ABSTRACT

Various examples are directed to systems and methods for navigating an autonomous vehicle. Trip plan data may describe a plurality of candidate vehicle start points, a plurality of candidate waypoints, and a plurality of candidate vehicle end points. A plurality of candidate routes may be determined between an algorithm start point and an algorithm end point. Each candidate route of the plurality of candidate routes may include at least one of the plurality of candidate waypoints and at least one of the plurality of candidate vehicle end points. A best rate may be determined using the plurality of candidate routes. The best route may include a first candidate vehicle start point, a first candidate waypoint, and a first candidate vehicle end point. The autonomous vehicle may be controlled along the best route from the first candidate vehicle start point towards the first candidate vehicle end point.

18 Claims, 13 Drawing Sheets

AUTONOMOUS VEHICLE WAYPOINT ROUTING

FIELD

This application claims the benefit of U.S. Provisional Patent Application Ser. No. 62/719,982, filed on Aug. 20, 2018, which is incorporated herein by reference in its entirety.

FIELD

The document pertains generally, but not by way of limitation, to devices, systems, and methods for operating an autonomous vehicle.

BACKGROUND

An autonomous vehicle is a vehicle that is capable of sensing its environment and operating some or all of the vehicle's controls based on the sensed environment. An autonomous vehicle includes sensors that capture signals describing the environment surrounding the vehicle. The autonomous vehicle processes the captured sensor signals to comprehend the environment and automatically operates some or all of the vehicle's controls based on the resulting information.

DRAWINGS

In the drawings, which are not necessarily drawn to scale, like numerals may describe similar components in different views. Like numerals having different letter suffixes may represent different instances of similar components. Some embodiments are illustrated by way of example, and not of limitation, in the figures of the accompanying drawings.

DESCRIPTION

Figure 1:
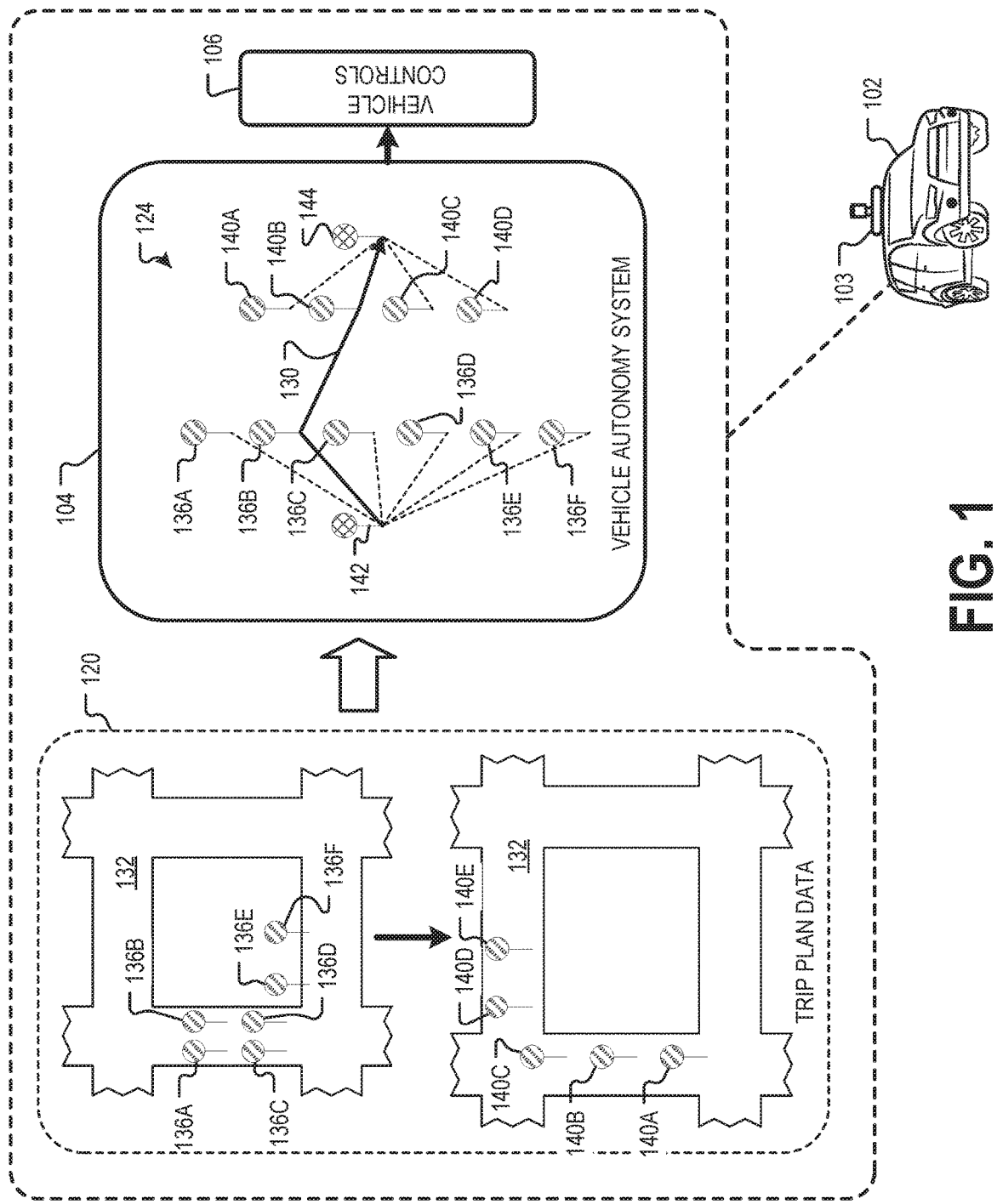
FIG. 1 is a diagram showing one example of an environment for routing an autonomous vehicle.

Examples described herein are directed to systems and methods for routing an autonomous vehicle.

In an autonomous or semi-autonomous vehicle (collectively referred to as an autonomous vehicle (AV)), a vehicle autonomy system, sometimes referred to as an AV stack, controls one or more of braking, steering, or throttle of the vehicle. In a fully-autonomous vehicle, the vehicle autonomy system assumes full control of the vehicle. In a semi-autonomous vehicle, the vehicle autonomy system assumes a portion of the vehicle control, with a human user (e.g., a vehicle operator) still providing some control input.

A vehicle autonomy system can control an autonomous vehicle along a route. A route is a path that the autonomous vehicle takes, or plans to take, over one or more roadways. The vehicle autonomy system can be programmed to generate routes that minimize the time, danger, and/or other factors associated with driving on the roadways. One way of generating routes is to use a path planning algorithm, such as, for example, A*, D*, Focused D*, D* Lite, GD*, or Dijkstra's algorithm.

Using a path planning algorithm, the vehicle autonomy system generates a best route by selecting the best combination of route components. A route component is a section or segment of roadway on which the autonomous vehicle can travel. Route components can have directionality and connectivity. The directionality of a route component describes a direction in which the autonomous vehicle can traverse the route component. The connectivity of a route component describes other route components to which the autonomous vehicle can travel from a first route component or from which the autonomous vehicle can travel to the first route component. Route components, or transitions between route components, can also have a cost indicating an estimated driving time to traverse the route component, danger risk, and/or other factors. In some examples, higher cost generally corresponds to more negative characteristics of a route component (e.g., longer estimated driving time, higher danger risk, etc.).

The vehicle autonomy system executes a path planning algorithm to determine a best route. The best route includes a string of connected route components between a vehicle start point and a vehicle end point, sometimes traversing one or more waypoints. A vehicle start point is an initial route component of a route. A vehicle end point is a last route component of a route. A waypoint is a route component between the vehicle start point and the vehicle end point that the autonomous vehicle traverses on a route. The best route identified by the path planning algorithm is the route with the lowest cost (e.g., the route that has the lowest cost or the highest benefit).

Path planning algorithms are useful for determining a best route from a single vehicle start point to a single vehicle end point. In some circumstances, however, it is desirable to navigate an autonomous vehicle with more flexibility. For example, some trips can include multiple candidate vehicle start points and/or multiple candidate vehicle end points. Also, some trips can include one or more candidate waypoints.

Consider an example where the autonomous vehicle is to pick-up and drop-off a passenger. The vehicle autonomy system routes the autonomous vehicle from its current location to a pick-up point (e.g., route component where the passenger can be picked up). From there, the vehicle autonomy system routes the vehicle to a drop-off point (e.g., a route component where the passenger can be dropped-off). If there is a single pick-up point and a single drop-off point, the best route for transporting the passenger can often be found by executing a path planning algorithm once. In many circumstances, however, there are multiple acceptable pick-up points and/or multiple acceptable drop-off points. For example, if the passenger is at an address on a city block, it may be acceptable to pick-up the passenger at any of a number of different locations or points on the roadways surrounding the block. Similarly, if the passenger is to be dropped off at a particular address, there may be multiple points on or near the roadways around the address where the passenger can be acceptably dropped-off.

Consider another example where an autonomous vehicle is to deliver cargo to a particular location. In this example, the autonomous vehicle picks-up a take-out meal at a restaurant and delivers the take-out meal to a customer's home or other location. There may be multiple pick-up points around the restaurant where the autonomous vehicle can collect the cargo. For example, the autonomous vehicle may pick-up the cargo at the front of the restaurant, the rear of the restaurant, etc. Similarly, there may be multiple drop-off points where the autonomous vehicle can drop-off the cargo. For example, the autonomous vehicle can drop-off the cargo in the customer's driveway, in an alley behind the customer's residence, etc. These are just a few examples of situations where it may be desirable to route an autonomous vehicle using multiple candidate vehicle start points, end points, or waypoints.

Because many path planning algorithms determine a best route from a single vehicle start point to a single vehicle end point, it can be challenging to perform route planning in an environment in which there are multiple candidate vehicle start points, end points, or waypoints. For example, the vehicle autonomy system could find the best route between each unique combination of vehicle start points, end points, and waypoints. The overall best route can then be selected from the results. This technique, however, can consume excessive time and/or processing capacity. For example, if there are "M" candidate vehicle start points and "N" candidate vehicle end points, the vehicle autonomy system would execute the path planning algorithm "M×N" times. If the route also needs to traverse at least one of "L" candidate waypoints, the number of runs of the path planning algorithm is increased to "L×M×N."

In some examples described herein, the vehicle autonomy system is programmed to perform route planning for multiple candidate vehicle start points and/or multiple candidate vehicle end points utilizing an algorithm start point and/or an algorithm end point. Algorithm start points and algorithm end points are treated as route segments in executing the path planning algorithm, but may not correspond to actual route segments. For example, route segments correspond to geographic locations. A route segment denotes a particular lane or other section of roadway that the vehicle can traverse. On the other hand, an algorithm start point or algorithm end point may not correspond to a geographic location. Algorithm start points that do not correspond to a geographic location can be called non-geographic.

For example, the vehicle autonomy system can select an algorithm start point that is connected to a set of multiple candidate vehicle start points. In this way, a best route beginning at the algorithm start point will pass through at least one candidate vehicle start point. The algorithm start point is connected to the candidate vehicle start points in the sense that the vehicle autonomy system is permitted to consider routes that traverse directly from the algorithm start point to any of the candidate vehicle start points. In examples where the algorithm start point does not correspond to a geographic location, such a traversal from the algorithm start point to a candidate vehicle start point may not correspond to any physical travel for the vehicle. As described herein, however, using algorithm start points (and algorithm end points) as described herein improves the performance of the vehicle autonomy system in generating a best route.

Each transition from the algorithm start point to one of the candidate vehicle start points is considered to have an associated cost, similar to the costs associated with route segments and/or transitions therebetween. The vehicle autonomy system executes a path planning algorithm to find a best route. The best route begins at the algorithm start point and passes from the algorithm start point to one of the candidate vehicle start points. The first candidate vehicle start point on the best route is selected vehicle start point for the best route.

Similarly, the vehicle autonomy system can select an algorithm end point that is connected from a set of multiple candidate vehicle end points. Each transition from one of the candidate vehicle end points to the algorithm end point is also considered to have an associated cost. Like an algorithm start point, the algorithm end point may not correspond to a route component or other geographic location. Algorithm end points that do not correspond to a geographic location can be called non-geographic. The vehicle autonomy system executes the path planning algorithm to find the best route to the algorithm end point. This best route will pass from one of the candidate vehicle end points to the algorithm end point. The last candidate vehicle end point on the best route before the algorithm end point is the selected vehicle end point for the best route. In some examples, algorithm end points and algorithm start points can be used together, for example, when a trip includes multiple candidate vehicle start points and multiple candidate vehicle end points.

Utilizing an algorithm start point and/or algorithm end point as described herein increase the efficiency of the vehicle autonomy system. For example, utilizing algorithm start points and/or end points as described herein can reduce the number of times that the vehicle autonomy system executes the path planning algorithm.

In some examples, algorithm start and/or end points can be used in this manner when the autonomous vehicle is traversing a predefined route. There are various reasons that an autonomous vehicle could traverse a predefined route. For example, the autonomous vehicle might traverse a predefined route to collect remote sensing data about the predefined route for generating map data, as described herein. Also, for example, an autonomous vehicle can be programmed to take a predefined route as a holding pattern while awaiting payload, such as a passenger or cargo. Sometimes, an autonomous vehicle deviates from the predefined route, for example, to respond to traffic conditions, to pick up payload, etc. In these cases, getting back to the predefined route can be challenging. For example, the vehicle autonomy system can use a path planning algorithm to route the autonomous vehicle back to the beginning of the predefined route, but this can introduce considerable inefficiencies.

In some examples, an algorithm end point can be used to efficiently route the vehicle back to the predefined route without necessarily sending it to the beginning of the predefined route. For example, some or all of the route components making up the predefined route can be considered candidate vehicle end points. An algorithm end point is determined to be connected to each of the candidate vehicle end points and a cost is assigned for transitions between the vehicle end points and the algorithm end points. The vehicle autonomy system determines a best route from a start point (e.g., an algorithm start point and/or the vehicle's current position) to the algorithm end point. The vehicle autonomy system controls the autonomous vehicle along the best route. When the autonomous vehicle reaches the vehicle end point, which is also a route component on the predefined route, it continues along the predefined route.

Algorithm start points and/or end points can be used to improve path planning in examples having candidate waypoints. This can be accomplished by breaking the path planning problem into stages. The stages can be executed from candidate vehicle start points to candidate vehicle end points and or from candidate vehicle end points to candidate vehicle start points. In an example executed from candidate vehicle end points to candidate vehicle start points, the vehicle autonomy system can select a first stage algorithm end point that is connected to the candidate vehicle end points. The vehicle autonomy system can also select a first stage algorithm start point that is connected to a set of candidate waypoints (e.g., the set of candidate waypoints immediately before the set of candidate end points). The candidate vehicle start points may not be considered in the first stage.

The vehicle autonomy system executes a path planning algorithm to find a best candidate route from the first stage algorithm start point to the first stage algorithm end point. The best candidate route proceeds from the algorithm start point to one of the candidate waypoints. The vehicle autonomy system then executes the path planning algorithm additional times finding the next-best routes until it identifies at least one candidate route traversing each of the candidate waypoints. The result may be a set of M candidate routes, where M is the number of candidate waypoints. The candidate routes can be the lowest cost routes traversing each of the respective candidate waypoints.

The candidate routes can be found using a path planning algorithm that maintains its state, such as D*, and variants thereof. Additional executions of the path planning algorithm after finding the first candidate route can re-use previously-determined state data. In this way, the subsequent executions may not consume as much time and/or processing resources as the first execution of the algorithm. For example, the D* algorithm generates node expansions for various route components and may start from the algorithm end point. Because subsequent executions of the algorithm are relative to the same algorithm end point, data generated from the original node expansions can be re-used.

At a second stage, the vehicle autonomy system selects a second stage algorithm start point and a second stage algorithm end point. The second stage algorithm start point is connected to the respective candidate vehicle start points as described herein. The second stage algorithm end point is connected to the respective candidate waypoints. Costs for traversing from the respective candidate waypoints to the algorithm end point are based on the costs of the candidate routes determined at the previous stage. For example, the cost from a first candidate waypoint to the second stage algorithm end point is or is based on the cost associated with the best route from first stage traversed the first candidate waypoint, and so on. The vehicle autonomy system determines the best route from the second stage algorithm start point to the second stage algorithm end point. The overall best route is found by combining a portion of the second stage best route between a candidate vehicle start point and a candidate waypoint and a portion of the first stage candidate route between the candidate waypoint and a candidate vehicle end point.

Although two stages are described here, the multi-stage technique can be used for an arbitrary number of stages. For example, a trip plan can include more than one set of candidate waypoints. A first stage can find the candidate routes between the last set of candidate waypoints and candidate vehicle end points. A second stage can find candidate routes between the next-to-last set of candidate waypoints and the last set of candidate waypoints, and so on until a stage includes the candidate vehicle start points. The overall best route can be found be piecing together portions of the candidate routes from different stages as described herein.

In some examples, costs for route components can be computed differently for different stages. Consider an example where it is more desirable to optimize a route between the vehicle start point and a waypoint than it is to optimize the route between the waypoint and the vehicle end point. In this example, route component costs can be weighted higher during the stage that finds candidate routes from the candidate vehicle start points and candidate waypoints and lower during the other stage or stages.

Also, note that various examples described herein execute stages from the candidate vehicle end points to the candidate vehicle start points. This is consistent with implementations that execute a path planning algorithm from the end point to the start point. In some examples, the multi-stage technique can also be used with path planning algorithms that can work from the start point to the end point. For example, the first stage algorithm start point can be connected to candidate vehicle start points and the first stage algorithm end point can be connected to a first set of candidate waypoints, and so on.

Various examples here are described in the context of a vehicle autonomy system that is physically present at an autonomous vehicle. In some examples, some or all of the systems and methods described herein can be performed outside of an autonomous vehicle. For example, a dispatch or other system can perform some or all of the operations for generating a best route and provide its results to an autonomous vehicle.

FIG. 1 is a diagram showing one example of an environment 100 for routing an autonomous vehicle. The environment 100 includes a vehicle 102. The vehicle 102 can be a passenger vehicle such as a car, a truck, a bus, or other similar vehicle. The vehicle 102 can also be a delivery vehicle, such as a van, a truck, a tractor trailer, etc. The vehicle 102 is a self-driving vehicle (SDV) or autonomous vehicle (AV) including a vehicle autonomy system 104 that is configured to operate some or all of the controls of the vehicle 102 (e.g., acceleration, braking, steering). The vehicle autonomy system 104 is configured to generate routes for the vehicle 102 as described herein.

In some examples, the vehicle autonomy system 104 is operable in different modes, where the vehicle autonomy system 104 has differing levels of control over the vehicle 102 in different modes. In some examples, the vehicle autonomy system 104 is operable in a full autonomous mode in which the vehicle autonomy system 104 has responsibility for all or most of the controls of the vehicle 102. In addition to or instead of the full autonomous mode, the vehicle autonomy system 104, in some examples, is operable in a semi-autonomous mode in which a human user or driver is responsible for some or all of the control of the vehicle 102. Additional details of an example vehicle autonomy system are provided in FIG. 3.

The vehicle 102 has one or more remote-detection sensors 103 that receive return signals from the environment 100. Return signals may be reflected from objects in the environment 100, such as the ground, buildings, trees, etc. The remote-detection sensors 103 may include one or more active sensors, such as LIDAR, RADAR, and/or SONAR that emit sound or electromagnetic radiation in the form of light or radio waves to generate return signals. The remote-detection sensors 103 can also include one or more passive sensors, such as cameras or other imaging sensors, proximity sensors, etc., that receive return signals that originated from other sources of sound or electromagnetic radiation. Information about the environment 100 is extracted from the return signals. In some examples, the remote-detection sensors 103 include one or more passive sensors that receive reflected ambient light or other radiation, such as a set of monoscopic or stereoscopic cameras. Remote-detection sensors 103 provide remote sensor data that describes the environment 100. The vehicle 102 can also include other types of sensors, for example, as described in more detail with respect to FIG. 3.

In the example environment 100 of FIG. 1, the vehicle autonomy system 104 generates a best route from one of a set of candidate vehicle start points 136A, 136B, 136C, 136D, 136E, 136F to one of a set of candidate vehicle end points 140A, 140B, 140C, 140D. The vehicle autonomy system 104 accesses trip plan data 120. The trip plan data 120 describes candidate vehicle start points 136A, 136B, 136C, 136D, 136E, 136F and candidate vehicle end points 140A, 140B, 140C, 140D. The trip plan data 120 can be received from any suitable source. In some examples, the trip plan data 120 is received from a dispatch or other centralized routing system. In other examples, the trip plan data 120 is generated by the vehicle autonomy system 104, for example, by a commander thereof as described herein.

In the example of FIG. 1, the trip plan data 120 is shown with visual representations of the respective candidate vehicle start points 136A, 136B, 136C, 136D, 136E, 136F and candidate vehicle end points 140A, 140B, 140C, 140D on roadways 132. In various examples, however, the trip plan data 120 may indicate candidate vehicle start points 136A, 136B, 136C, 136D, 136E, 136F and candidate vehicle end points 140A, 140B, 140C, 140D with latitude and longitude positions, map coordinates, or other suitable representations.

The vehicle autonomy system 104 receives the trip plan data 120 and generates a best route utilizing a path planning algorithm utilizing an algorithm start point 142 and algorithm end point 144 as described herein. FIG. 1 also shows a visual representation 124 of the candidate vehicle start points 136A, 136B, 136C, 136D, 136E, 136F and candidate vehicle end points 140A, 140B, 140C, 140D arranged with an algorithm start point 142 and an algorithm end point 144. The algorithm start point 142 is connected to each of the candidate vehicle start points 136A, 136B, 136C, 136D, 136E, 136F such that routes beginning at the algorithm start point 142 proceed from the algorithm start point 142 to one of the candidate vehicle start points 136A, 136B, 136C, 136D, 136E, 136F. Similarly, the algorithm end point 144 is connected to each of the candidate vehicle end points 140A, 140B, 140C, 140D such that routes ending at the algorithm end point 144 proceed to the algorithm end point 144 from one of the candidate vehicle end points 140A, 140B, 140C, 140D.

The vehicle autonomy system 104 applies a path planning algorithm to determine the best route 130 between the algorithm start point 142 and the algorithm end point 144. In the example of FIG. 1, the best route 130 between the algorithm start point 142 and the algorithm end point 144 passes through candidate vehicle start point 136B and candidate vehicle end point 140B. Accordingly, the vehicle autonomy system 104 can provide commands to the vehicle controls 106 to cause the vehicle to move along the best route 130 from the selected vehicle start point 136B to the selected vehicle end point 140B.

Figure 2:
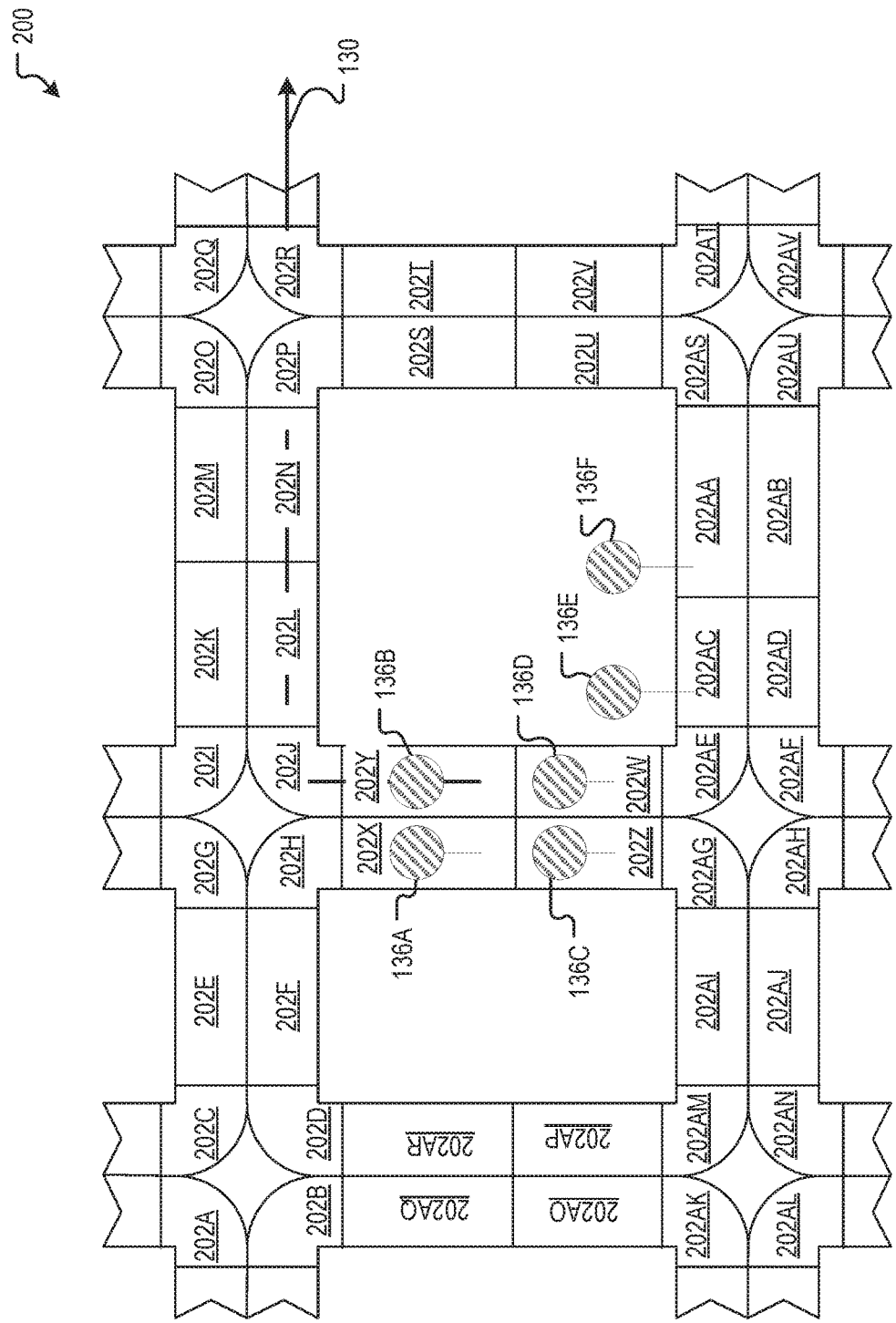
FIG. 2 is a diagram showing an example representation of the candidate vehicle start points with roadways illustrated as route components.

FIG. 2 is a diagram 200 showing an example representation of the candidate vehicle start points 136A, 136B, 136C, 136D, 136E, 136F with roadways illustrated as route components 202A, 202B, 202C, 202D, 202E, 202F, 202G, 202H, 202I, 202J, 202K, 202L, 202M, 202N, 202O, 202P, 202Q, 202R, 202S, 202T, 202U, 202V, 202W, 202X, 202Y, 202Z, 202AA, 202AB, 202AC, 202AD, 202AE, 202AF, 202AG, 202AH, 202AI, 202AJ, 202AK, 202AL, 202AN, 202AM, 202AN, 202AO, 202AP, 202AQ, 202AR. The example diagram 200 also shows a portion of the best route 130. In the example diagram 200, candidate vehicle start points 136A, 136B, 136C, 136D, 136E, 136F correspond to respective route components 202X, 202Y, 202Z, 202W, 202AC, and 202AA.

In the example of FIG. 2, each of the route components 202A-202AR can be associated with a cost for traversing the route component 202A-202AR. In some examples, transitions between route components 202A-202AR are also associated with a cost. The vehicle autonomy system 104 utilizes these costs to generate the best route 130 as described herein.

Figure 3:
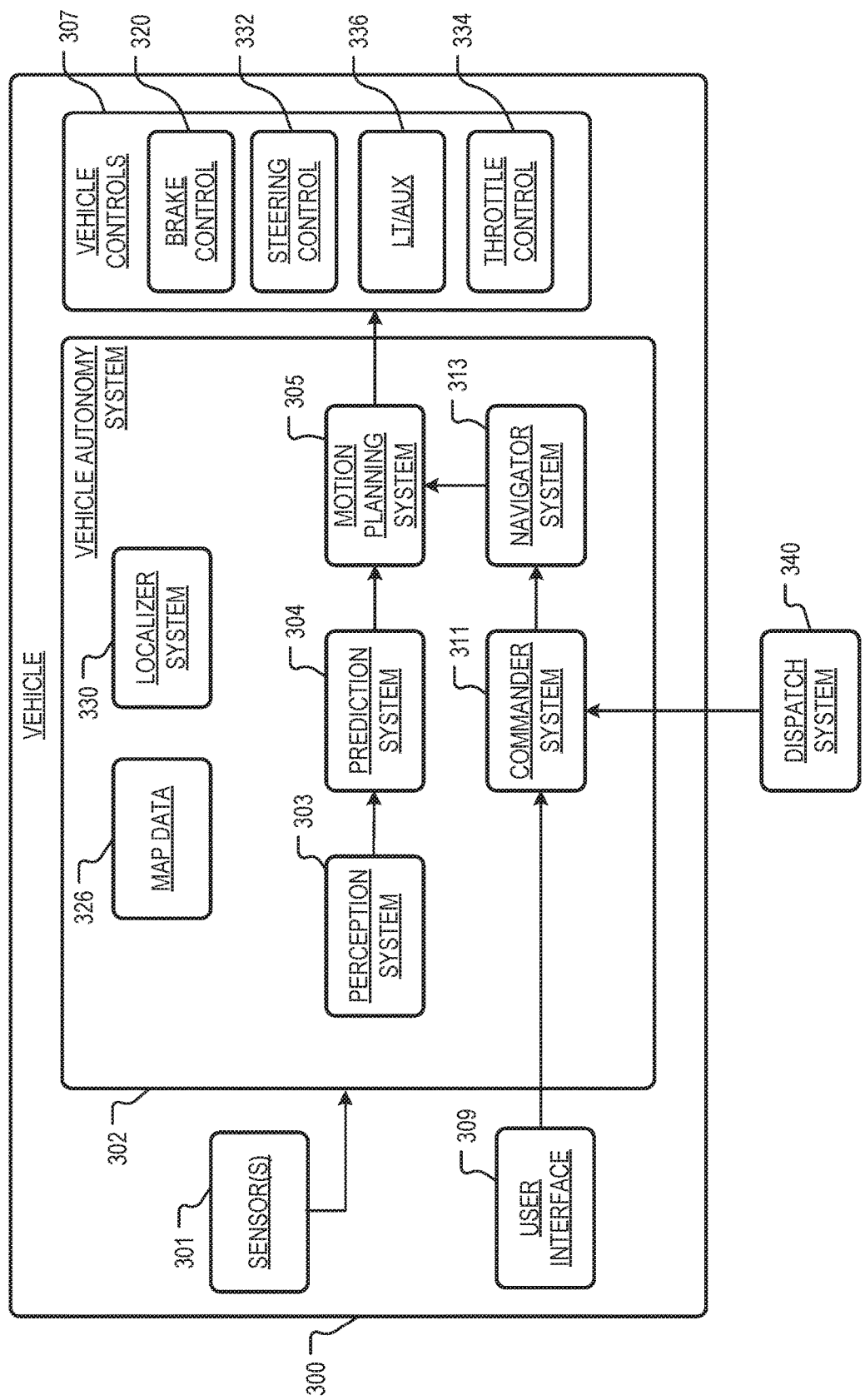
FIG. 3 depicts a block diagram of an example vehicle according to example aspects of the present disclosure.

FIG. 3 depicts a block diagram of an example vehicle 300 according to example aspects of the present disclosure. The vehicle 300 includes one or more sensors 301, a vehicle autonomy system 302, and one or more vehicle controls 307. The vehicle 300 can be an autonomous vehicle, as described herein.

The vehicle autonomy system 302 includes a commander system 311, a navigator system 313, a perception system 303, a prediction system 304, a motion planning system 305, and a localizer system 330 that cooperate to perceive the surrounding environment of the vehicle 300 and determine a motion plan for controlling the motion of the vehicle 300 accordingly.

The vehicle autonomy system 302 is engaged to control the vehicle 300 or to assist in controlling the vehicle 300. In particular, the vehicle autonomy system 302 receives sensor data from the one or more sensors 301, attempts to comprehend the environment surrounding the vehicle 300 by performing various processing techniques on data collected by the sensors 301, and generates an appropriate route through the environment. The vehicle autonomy system 302 sends commands to control the one or more vehicle controls 307 to operate the vehicle 300 according to the route.

Various portions of the vehicle autonomy system 302 receive sensor data from the one or more sensors 301. For example, the sensors 301 may include remote-detection sensors as well as motion sensors such as an inertial measurement unit (MiI), one or more encoders, or one or more odometers. The sensor data can include information that describes the location of objects within the surrounding environment of the vehicle 300, information that describes the motion of the vehicle 300, etc.

The sensors 301 may also include one or more remote-detection sensors or sensor systems, such as a LIDAR, a RADAR, one or more cameras, etc. As one example, a LIDAR system of the one or more sensors 301 generates sensor data (e.g., remote-detection sensor data) that includes the location (e.g., in three-dimensional space relative to the LIDAR system) of a number of points that correspond to objects that have reflected a ranging laser. For example, the LIDAR system can measure distances by measuring the Time of Flight (TOF) that it takes a short laser pulse to travel from the sensor to an object and back, calculating the distance from the known speed of light.

As another example, a RADAR system of the one or more sensors 301 generates sensor data (e.g., remote-detection sensor data) that includes the location (e.g., in three-dimensional space relative to the RADAR system) of a number of points that correspond to objects that have reflected ranging radio waves. For example, radio waves (e.g., pulsed or continuous) transmitted by the RADAR system can reflect off an object and return to a receiver of the RADAR system, giving information about the object's location and speed. Thus, a RADAR system can provide useful information about the current speed of an object.

As yet another example, one or more cameras of the one or more sensors 301 may generate sensor data (e.g., remote sensor data) including still or moving images. Various processing techniques (e.g., range imaging techniques such as, for example, structure from motion, structured light, stereo triangulation, and/or other techniques) can be performed to identify the location (e.g., in three-dimensional space relative to the one or more cameras) of a number of points that correspond to objects that are depicted in an image or images captured by the one or more cameras. Other sensor systems can identify the location of points that correspond to objects as well.

As another example, the one or more sensors 301 can include a positioning system. The positioning system determines a current position of the vehicle 300. The positioning system can be any device or circuitry for analyzing the position of the vehicle 300. For example, the positioning system can determine a position by using one or more of inertial sensors, a satellite positioning system such as a Global Positioning System (GPS), based on IP address, by using triangulation and/or proximity to network access points or other network components (e.g., cellular towers, WiFi access points) and/or other suitable techniques. The position of the vehicle 300 can be used by various systems of the vehicle autonomy system 302.

Thus, the one or more sensors 301 can be used to collect sensor data that includes information that describes the location (e.g., in three-dimensional space relative to the vehicle 300) of points that correspond to objects within the surrounding environment of the vehicle 300. In some implementations, the sensors 301 can be positioned at various different locations on the vehicle 300. As an example, in some implementations, one or more cameras and/or LIDAR sensors can be located in a pod or other structure that is mounted on a roof of the vehicle 300 while one or more RADAR sensors can be located in or behind the front and/or rear bumper(s) or body panel(s) of the vehicle 300. As another example, camera(s) can be located at the front or rear bumper(s) of the vehicle 300. Other locations can be used as well.

The localizer system 330 receives some or all of the sensor data from sensors 301 and generates vehicle poses for the vehicle 300. A vehicle pose describes the position and attitude of the vehicle 300. The vehicle pose (or portions thereof) can be used by various other components of the vehicle autonomy system 302 including, for example, the perception system 303, the prediction system 304, the motion planning system 305 and the navigator system 313.

The position of the vehicle 300 is a point in a three-dimensional space. In some examples, the position is described by values for a set of Cartesian coordinates, although any other suitable coordinate system may be used. The attitude of the vehicle 300 generally describes the way in which the vehicle 300 is oriented at its position. In some examples, attitude is described by a yaw about the vertical axis, a pitch about a first horizontal axis, and a roll about a second horizontal axis. In some examples, the localizer system 330 generates vehicle poses periodically (e.g., every second, every half second). The localizer system 330 appends time stamps to vehicle poses, where the time stamp for a pose indicates the point in time that is described by the pose. The localizer system 330 generates vehicle poses by comparing sensor data (e.g., remote sensor data) to map data 326 describing the surrounding environment of the vehicle 300.

In some examples, the localizer system 330 includes one or more pose estimators and a pose filter. Pose estimators generate pose estimates by comparing remote-sensor data (e.g., LIDAR, RADAR) to map data. The pose filter receives pose estimates from the one or more pose estimators as well as other sensor data such as, for example, motion sensor data from an IMU, encoder, or odometer. In some examples, the pose filter executes a Kalman filter or machine learning algorithm to combine pose estimates from the one or more pose estimators with motion sensor data to generate vehicle poses. In some examples, pose estimators generate pose estimates at a frequency less than the frequency at which the localizer system 330 generates vehicle poses. Accordingly, the pose filter generates some vehicle poses by extrapolating from a previous pose estimate utilizing motion sensor data.

Vehicle poses and/or vehicle positions generated by the localizer system 330 can be provided to various other components of the vehicle autonomy system 302. For example, the commander system 311 may utilize a vehicle position to determine whether to respond to a call from a dispatch system 340.

The commander system 311 determines a set of one or more target locations that are used for routing the vehicle 300. The target locations can be determined based on user input received via a user interface 309 of the vehicle 300. The user interface 309 may include and/or use any suitable input/output device or devices. In some examples, the commander system 311 determines the one or more target locations considering data received from the dispatch system 340. The dispatch system 340 can be programmed to provide instructions to multiple vehicles, for example, as part of a fleet of vehicles for moving passengers and/or cargo. Data from the dispatch system 340 can be provided via a wireless network, for example.

The navigator system 313 receives one or more target locations from the commander system 311 and map data 326. Map data 326, for example, may provide detailed information about the surrounding environment of the vehicle 300. Map data 326 can provide information regarding identity and location of different roadways and segments of roadways (e.g., lane segments). A roadway is a place where the vehicle 300 can drive and may include, for example, a road, a street, a highway, a lane, a parking lot, or a driveway.

From the one or more target locations and the map data 326, the navigator system 313 generates route data describing a route for the vehicle to take to arrive at the one or more target locations. The navigator system 313, in some examples, also generates route extension data describing route extensions, as described herein.

In some implementations, the navigator system 313 determines route data using one or more path planning algorithms based on costs for route components, as described herein. For example, a cost for a route can indicate a time of travel, risk of danger, or other or other factor associated with adhering to a particular candidate route. For example, the reward can be of a sign opposite to that of cost. Route data describing a route is provided to the motion planning system 305, which commands the vehicle controls 307 to implement the route or route extension, as described herein.

The perception system 303 detects objects in the surrounding environment of the vehicle 300 based on sensor data, map data 326 and/or vehicle poses provided by the localizes system 330. For example, map data 326 used by the perception system may describe roadways and segments thereof and may also describe: buildings or other items or objects (e.g., lampposts, crosswalks, curbing); location and directions of traffic lanes or lane segments (e.g., the location and direction of a parking lane, a turning lane, a bicycle lane, or other lanes within a particular roadway); traffic control data (e.g., the location and instructions of signage, traffic lights, or other traffic control devices); and/or any other map data that provides information that assists the vehicle autonomy system 302 in comprehending and perceiving its surrounding environment and its relationship thereto.

In some examples, the perception system 303 determines state data for one or more of the objects in the surrounding environment of the vehicle 300. State data describes a current state of an object (also referred to as features of the object). The state data for each object describes, for example, an estimate of the object's: current location (also referred to as position); current speed (also referred to as velocity); current acceleration; current heading; current orientation; size/shape/footprint (e.g., as represented by a bounding shape such as a bounding polygon or polyhedron); type/class (e.g., vehicle versus pedestrian versus bicycle versus other); yaw rate; distance from the vehicle 300; minimum path to interaction with the vehicle 300; minimum time duration to interaction with the vehicle 300; and/or other state information.

In some implementations, the perception system 303 can determine state data for each object over a number of iterations. In particular, the perception system 303 updates the state data for each object at each iteration. Thus, the perception system 303 detects and tracks objects, such as vehicles, that are proximate to the vehicle 300 over time.

The prediction system 304 is configured to predict one or more future positions for an object or objects in the environment surrounding the vehicle 300 (e.g., an object or objects detected by the perception system 303). The prediction system 304 generates prediction data associated with one or more of the objects detected by the perception system 303. In some examples, the prediction system 304 generates prediction data describing each of the respective objects detected by the prediction system 304.

Prediction data for an object can be indicative of one or more predicted future locations of the object. For example, the prediction system 304 may predict where the object will be located within the next 5 seconds, 20 seconds, 300 seconds, etc. Prediction data for an object may indicate a predicted trajectory (e.g., predicted path) for the object within the surrounding environment of the vehicle 300. For example, the predicted trajectory (e.g., path) can indicate a path along which the respective object is predicted to travel over time (and/or the speed at which the object is predicted to travel along the predicted path). The prediction system 304 generates prediction data for an object, for example, based on state data generated by the perception system 303. In some examples, the prediction system 304 also considers one or more vehicle poses generated by the localizer system 330 and/or map data 326.

In some examples, the prediction system 304 uses state data indicative of an object type or classification to predict a trajectory for the object. As an example, the prediction system 304 can use state data provided by the perception system 303 to determine that a particular object (e.g., an object classified as a vehicle) approaching an intersection and maneuvering into a left-turn lane intends to turn left. In such a situation, the prediction system 304 predicts a trajectory (e.g., path) corresponding to a left-turn for the vehicle 300 such that the vehicle 300 turns left at the intersection. Similarly, the prediction system 304 determines predicted trajectories for other objects, such as bicycles, pedestrians, parked vehicles, etc. The prediction system 304 provides the predicted trajectories associated with the object(s) to the motion planning system 305.

In some implementations, the prediction system 304 is a goal-oriented prediction system 304 that generates one or more potential goals, selects one or more of the most likely potential goals, and develops one or more trajectories by which the object can achieve the one or more selected goals. For example, the prediction system 304 can include a scenario generation system that generates and/or scores the one or more goals for an object, and a scenario development system that determines the one or more trajectories by which the object can achieve the goals. In some implementations, the prediction system 304 can include a machine-learned goal-scoring model, a machine-learned trajectory development model, and/or other machine-learned models.

The motion planning system 305 commands the vehicle controls based at least in part on the predicted trajectories associated with the objects within the surrounding environment of the vehicle 300, the state data for the objects provided by the perception system 303, vehicle poses provided by the localizer system 330, map data 326, and route or route extension data provided by the navigator system 313. Stated differently, given information about the current locations of objects and/or predicted trajectories of objects within the surrounding environment of the vehicle 300, the motion planning system 305 determines control commands for the vehicle 300 that best navigate the vehicle 300 along the route or route extension relative to the objects at such locations and their predicted trajectories on acceptable roadways.

In some implementations, the motion planning system 305 can also evaluate one or more cost functions and/or one or more reward functions for each of one or more candidate control commands or sets of control commands for the vehicle 300. Thus, given information about the current locations and/or predicted future locations/trajectories of objects, the motion planning system 305 can determine a total cost (e.g., a sum of the cost(s) and/or reward(s)

provided by the cost function(s) and/or reward function(s)) of adhering to a particular candidate control command or set of control commands. The motion planning system 305 can select or determine a control command or set of control commands for the vehicle 300 based at least in part on the cost function(s) and the reward function(s). For example, the motion plan that minimizes the total cost can be selected or otherwise determined.

In some implementations, the motion planning system 305 can be configured to iteratively update the route or route extension for the vehicle 300 as new sensor data is obtained from one or more sensors 301. For example, as new sensor data is obtained from one or more sensors 301, the sensor data can be analyzed by the perception system 303, the prediction system 304, and the motion planning system 305 to determine the motion plan.

The motion planning system 305 can provide control commands to one or more vehicle controls 307. For example, the one or more vehicle controls 307 can include throttle systems, brake systems, steering systems, and other control systems, each of which can include various vehicle controls (e.g., actuators or other devices that control gas flow, steering, braking) to control the motion of the vehicle 300. The various vehicle controls 307 can include one or more controllers, control devices, motors, and/or processors.

The vehicle controls 307 can include a brake control module 320. The brake control module 320 is configured to receive a braking command and bring about a response by applying (or not applying) the vehicle brakes. In some examples, the brake control module 320 includes a primary system and a secondary system. The primary system receives braking commands and, in response, brakes the vehicle 300. The secondary system may be configured to determine a failure of the primary system to brake the vehicle 300 in response to receiving the braking command.

A steering control system 332 is configured to receive a steering command and bring about a response in the steering mechanism of the vehicle 300. The steering command is provided to a steering system to provide a steering input to steer the vehicle 300.

A lighting/auxiliary control module 336 receives a lighting or auxiliary command. In response, the lighting/auxiliary control module 336 controls a lighting and/or auxiliary system of the vehicle 300. Controlling a lighting system may include, for example, turning on, turning off, or otherwise modulating headlines, parking lights, running lights, etc. Controlling an auxiliary system may include, for example, modulating windshield wipers, a defroster, etc.

A throttle control system 334 is configured to receive a throttle command and bring about a response in the engine speed or other throttle mechanism of the vehicle. For example, the throttle control system 334 can instruct an engine and/or engine controller, or other propulsion system component to control the engine or other propulsion system of the vehicle 300 to accelerate, decelerate, or remain at its current speed.

Each of the perception system 303, the prediction system 304, the motion planning system 305, the commander system 311, the navigator system 313, and the localizer system 330, can be included in or otherwise a part of a vehicle autonomy system 302 configured to control the vehicle 300 based at least in part on data obtained from one or more sensors 301. For example, data obtained by one or more sensors 301 can be analyzed by each of the perception system 303, the prediction system 304, and the motion planning system 305 in a consecutive fashion in order to control the vehicle 300. While FIG. 3 depicts elements suitable for use in a vehicle autonomy system according to example aspects of the present disclosure, one of ordinary skill in the art will recognize that other vehicle autonomy systems can be configured to control an autonomous vehicle based on sensor data.

The vehicle autonomy system 302 includes one or more computing devices, which may implement all or parts of the perception system 303, the prediction system 304, the motion planning system 305 and/or the localizer system 330. Descriptions of hardware and software configurations for computing devices to implement the vehicle autonomy system 302 and/or the vehicle autonomy system 104 are provided herein at FIGS. 11 and 12.

Figure 4:
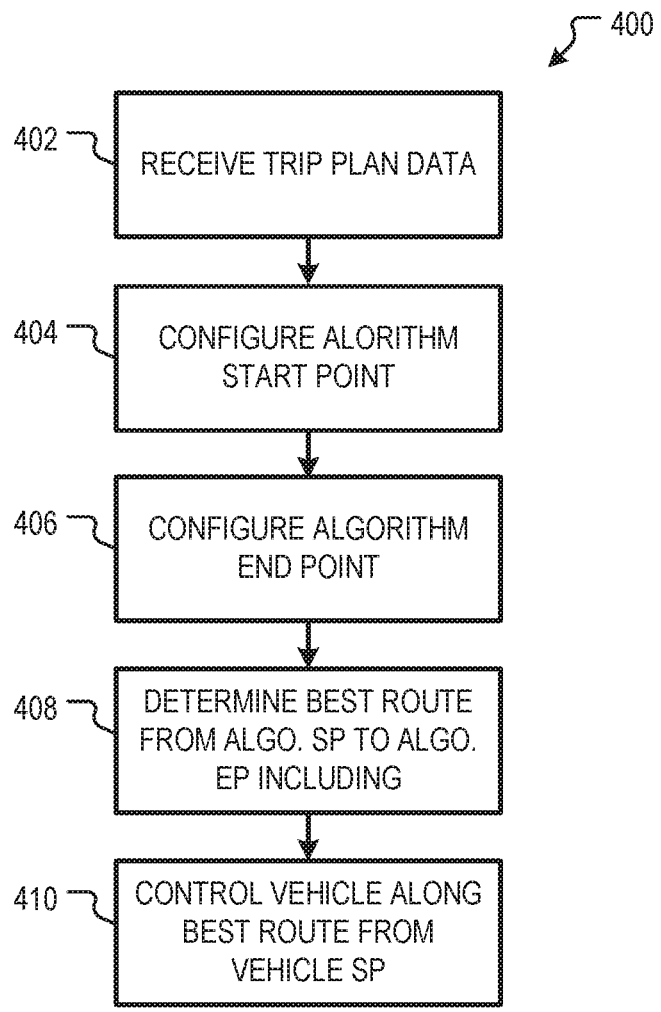
FIG. 4 is flowchart showing one example of a process flow that can be executed by a vehicle autonomy system to generate a best route for a vehicle using an algorithm start point and an algorithm end point.
Figure 5:
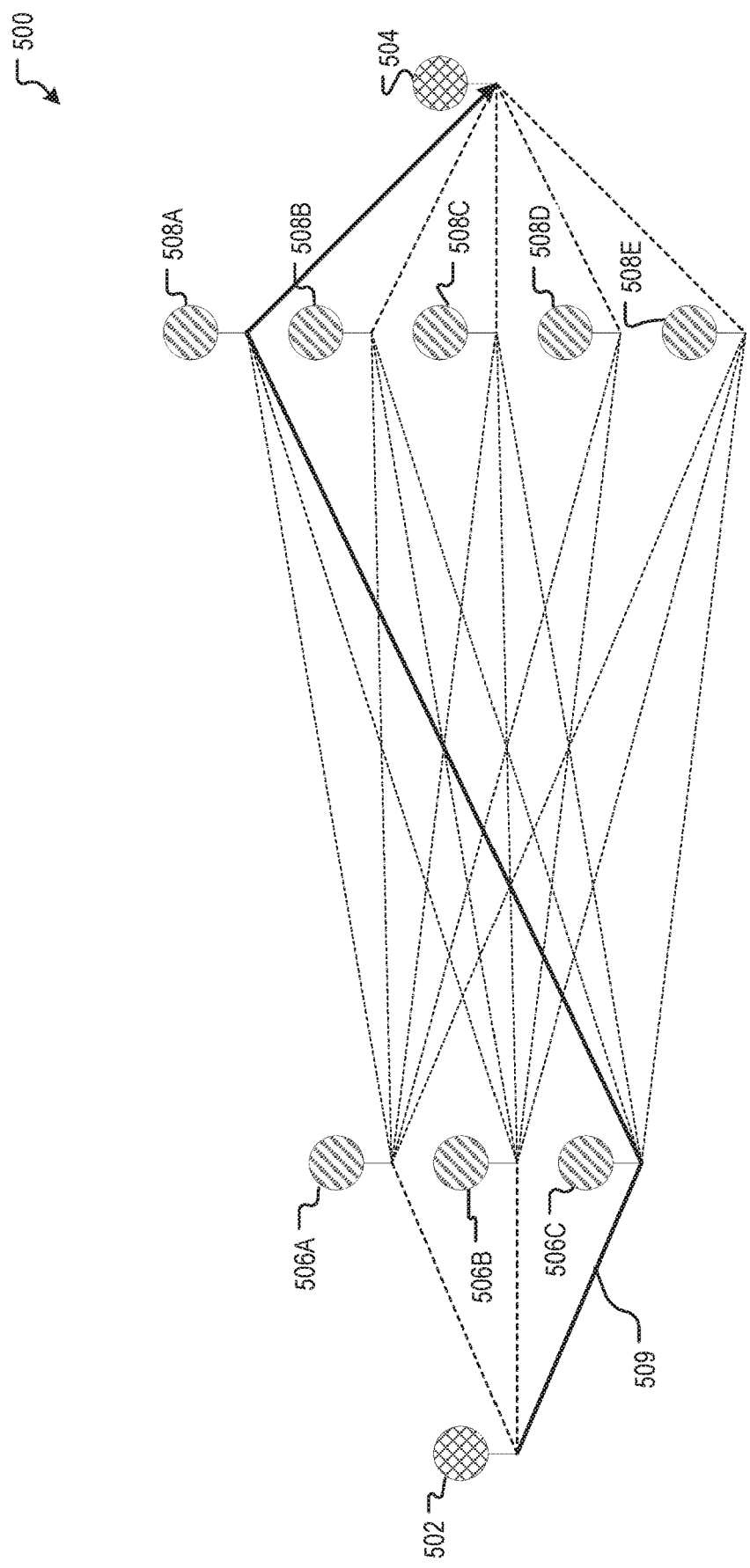
FIG. 5 is a diagram showing a representation of candidate vehicle start points, candidate vehicle end points, an algorithm start point, and an algorithm end point illustrating one example implementation of the process flow of FIG. 4.

FIG. 4 is flowchart showing one example of a process flow 400 that can be executed by a vehicle autonomy system (e.g., a navigator system thereof) to generate a best route for a vehicle using an algorithm start point and an algorithm end point. FIG. 5 is a diagram showing a representation of candidate vehicle start points 506A, 506B, 506C, candidate vehicle end points 508A, 508B, 508C, 508D, 508E, an algorithm start point 502, and an algorithm end point 504 illustrating one example implementation of the process flow 400.

Referring to FIG. 4, at operation 402, the vehicle autonomy system receives trip plan data. The trip plan data describes a number of candidate vehicle start points and a number of candidate vehicle end points. The trip plan describes a desired trip for the vehicle. As described herein, the candidate vehicle start points and candidate vehicle end points can include places where the vehicle can pick up or drop off payload, such as a passenger, cargo, etc. Candidate vehicle start points can At operation 404, the vehicle autonomy system configures an algorithm start point. The algorithm start point does not correspond to a route component and, accordingly, configuring the algorithm start point comprises determining costs associated with the algorithm start point. The vehicle autonomy system can consider the algorithm start point to connect to each of the candidate vehicle start points. This means that when the path planning algorithm is applied, it will be permissible for the vehicle to "move" from the algorithm start point to any of the connected candidate vehicle start points. Referring to the example of FIG. 5, the algorithm start point 502 is connected to each of the example candidate vehicle start points 506A, 506B, 506C.

Configuring the algorithm start point can also include determining costs for traversing from the algorithm start point to the respective candidate vehicle start points. The costs can be determined in any suitable way. In some examples, the cost for traversing from the algorithm start point to any of the candidate vehicle is the same (e.g., zero). In other examples, the costs for traversing from the algorithm start point to the respective candidate vehicle start points is based on a desirability of the vehicle start points. Consider an example in which a payload for the vehicle is a passenger and the candidate vehicle start points are places where the passenger can be picked-up. The cost for traversing to any given candidate vehicle start point can be more favorable (e.g., lower cost or higher reward) for candidate vehicle starting points that are closer, more accessible, or otherwise more favorable for picking-up the passenger.

At operation 406, the vehicle autonomy system configures an algorithm end point. The algorithm end point is connected to each of the candidate vehicle end points. For example, referring to FIG. 5, the algorithm end point 504 is connected to each of the candidate vehicle end points 508A, 508B, 508C, 508D, 508E. Configuring the algorithm end point can also include determining a cost associated with traversing from each of the respective candidate vehicle end points 508A, 508B, 508C, 508D, 508E to the algorithm end point. These costs can be the same (e.g., zero) or may reflect the desirability of the respective candidate vehicle end points 508A, 508B, 508C, 508D, 508E.

At operation 408, the vehicle autonomy system determines a best route from the algorithm start point to the algorithm end point. For example, the vehicle autonomy system applies a path planning algorithm to find the lowest cost and/or highest reward combination of route components between the algorithm start point and the algorithm end point. In the example of FIG. 5, the best route 509 is from the algorithm start algorithm 502 to the candidate vehicle start point 506C, to the candidate vehicle end point 508A, and finally to the algorithm end point 504. The physical portion of the best route 509 includes route components between the candidate vehicle start point 506C and the candidate vehicle end point 508A. Accordingly, the candidate vehicle start point 506C is the vehicle start point for the best route 509 and the candidate vehicle end point is the vehicle end point 508A for the best route 509.

At operation 410, the vehicle autonomy system controls the vehicle along the best route determined at operation 408 from the vehicle start point towards the vehicle end point. As described herein, even though the vehicle initially travels along the best route, it may deviate from the best route, for example, depending on roadway conditions, objects encountered in the vehicle's environment, etc.

The examples of FIGS. 4 and 5 show routes that include both an algorithm start point and an algorithm end point. Some examples may use an algorithm start point only or an algorithm end point only. For example, if there is just one candidate vehicle start point (e.g., the vehicle's present location) but multiple candidate vehicle end points, then the process flow 400 can be executed using the single candidate vehicle start point as a start point and an algorithm end point as an end point.

Figure 6:
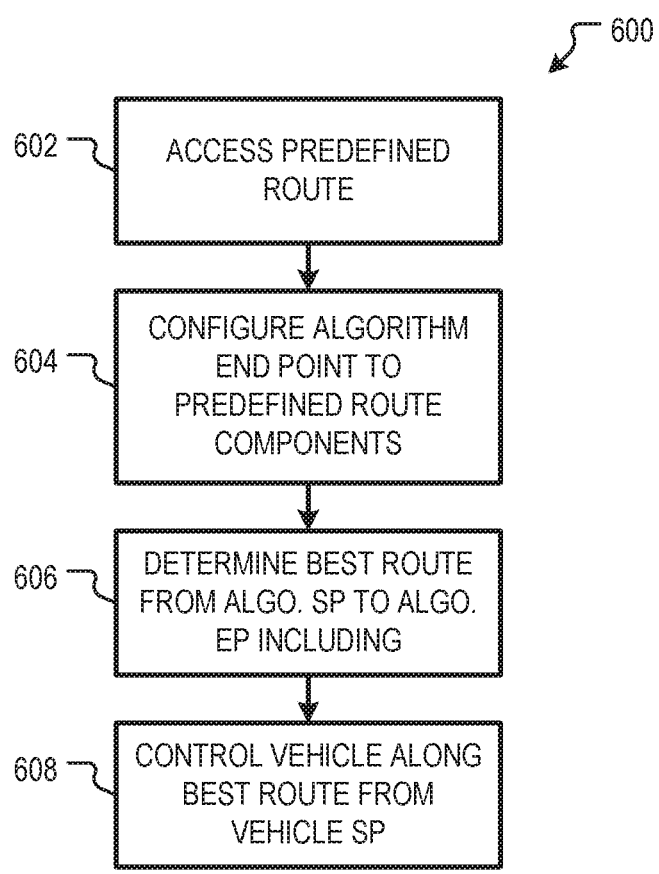
FIG. 6 is a flowchart showing one example of a process flow that can be executed by a vehicle autonomy system to generate a best route for a vehicle to a predefined route.

FIG. 6 is a flowchart showing one example of a process flow 600 that can be executed by a vehicle autonomy system (e.g., a navigator system thereof) to generate a best route for a vehicle to a predefined route. As described herein, a vehicle can be configured to traverse a predefined route for various reasons including, for example, to gather remote sensing data from the predefined route. When traversing a predefined route, a vehicle may leave the predefined route. For example, a passenger may need to stop or visit a destination off-route. When this occurs, it can be difficult for the vehicle to re-join the predefined route without returning to the beginning of the route. In the example of FIG. 6, some or all of the route components making up a predefined route or considered to be candidate vehicle end points. An algorithm end point connected to the vehicle end points is configured and a best route is found.

The process flow 600 can be executed when the vehicle is off the predefined route, for example, before the vehicle has begun to traverse the predefined route or after the vehicle has deviated from the predefined route. At operation 602, the vehicle autonomy system accesses data describing the predefined route. The data can be accessed from a data storage of the vehicle autonomy system and/or can be received from a dispatch or similar system.

At operation 604, the vehicle autonomy system configures an algorithm end point to predefined route components, considering each considered route component of the predefined route to be a candidate vehicle end point. The algorithm end point can be considered connected to a set of some or all of the route components of the predefined route. The vehicle autonomy system can assign a cost to transition from each of the considered route components of the predefined route to the algorithm end point. For example, all considered route components can have equal costs or, in some examples, the cost for a given route component can be based on the desirability of beginning the route at the given route component. At operation 606, the vehicle autonomy system determines a best route to the algorithm end point. The best route includes one of the route components of the predefined route, as described herein.

At operation 608, the vehicle autonomy system controls the vehicle along the best route to the route component of the predefined route. From there, the vehicle autonomy system can control the vehicle according to the predefined route. In some examples, the vehicle autonomy system is configured to control the vehicle back to portions of the predefined route that were skipped. For example if the process flow 600 places the vehicle at a route component in the middle of the predefined route, the vehicle may complete the predefined route from the beginning and then return to portions of the predefined route prior to the middle.

Some examples described herein utilize a multi-stage algorithm to find a best route in examples having one or more sets of candidate waypoints. For example, it may be desirable to route the vehicle from one of a set of candidate vehicle start points, traversing one of a set of candidate waypoints, and ending at one of a set of vehicle end points. Consider one example in which a vehicle is to pick up two passengers or other items of payload at different locations. In this example, the set of candidate vehicle start points is the set of places where the first passenger can be picked up. The set of candidate waypoints is the set of places where the second passenger can be picked up. The set of candidate vehicle end points is the set of places where the passengers can be dropped up. Some examples, can include more than one set of candidate waypoints, for example, if more than two items of payload are to be picked up and/or if payload is to be dropped off at more than one place.

To find a best multistage route, the vehicle autonomy system applies a path planning algorithm in multiple stages. Each stage considers a set of stage start points and a set of stage end points. Stage start points can include candidate vehicle start points or candidate waypoints. Similarly, stage end points can include candidate vehicle end points or candidate waypoints. For example, one stage will utilize stage start points that correspond to the candidate vehicle start points and stage end points that correspond to a set of candidate waypoints. Another stage will utilize stage start points that correspond to a set of candidate waypoints and stage end points that corresponds to the set of candidate vehicle end points. For routes with more than one set of candidate waypoints, one or more additional stages will use different sets of candidate waypoints as stage start points and stage end points.

Figure 7:
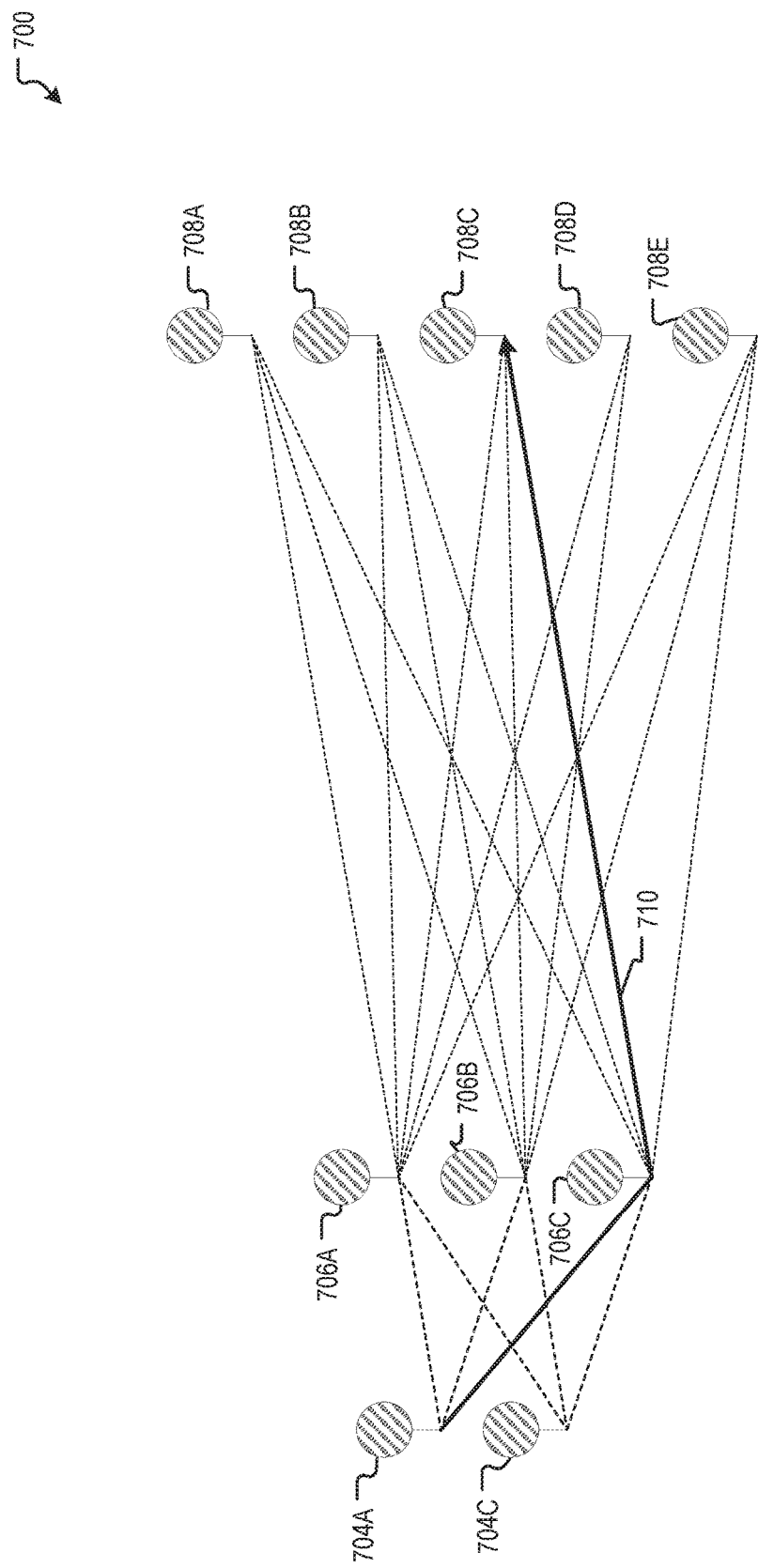
FIG. 7 is a diagram 700 showing one example of a route having a set of candidate waypoints.

FIG. 7 is a diagram 700 showing one example of a route having a set of candidate waypoints. The diagram 700 shows a set of candidate vehicle start points 704A, 704B, a set of candidate vehicle end points 708A, 708B, 708C, 708D, 708E, and a set of candidate waypoints 706A, 706B, 706C. In this example, the vehicle autonomy system finds the best route beginning at one of the candidate vehicle start points 704A, 704B, traversing through at least one of the candidate waypoints 706A, 706B, 706C and ending at one of the candidate vehicle end points 708A, 708B, 708C, 708D, 708E. For example, the vehicle autonomy system may break the route shown by FIG. 7 into stages, as described herein.

Figure 8:
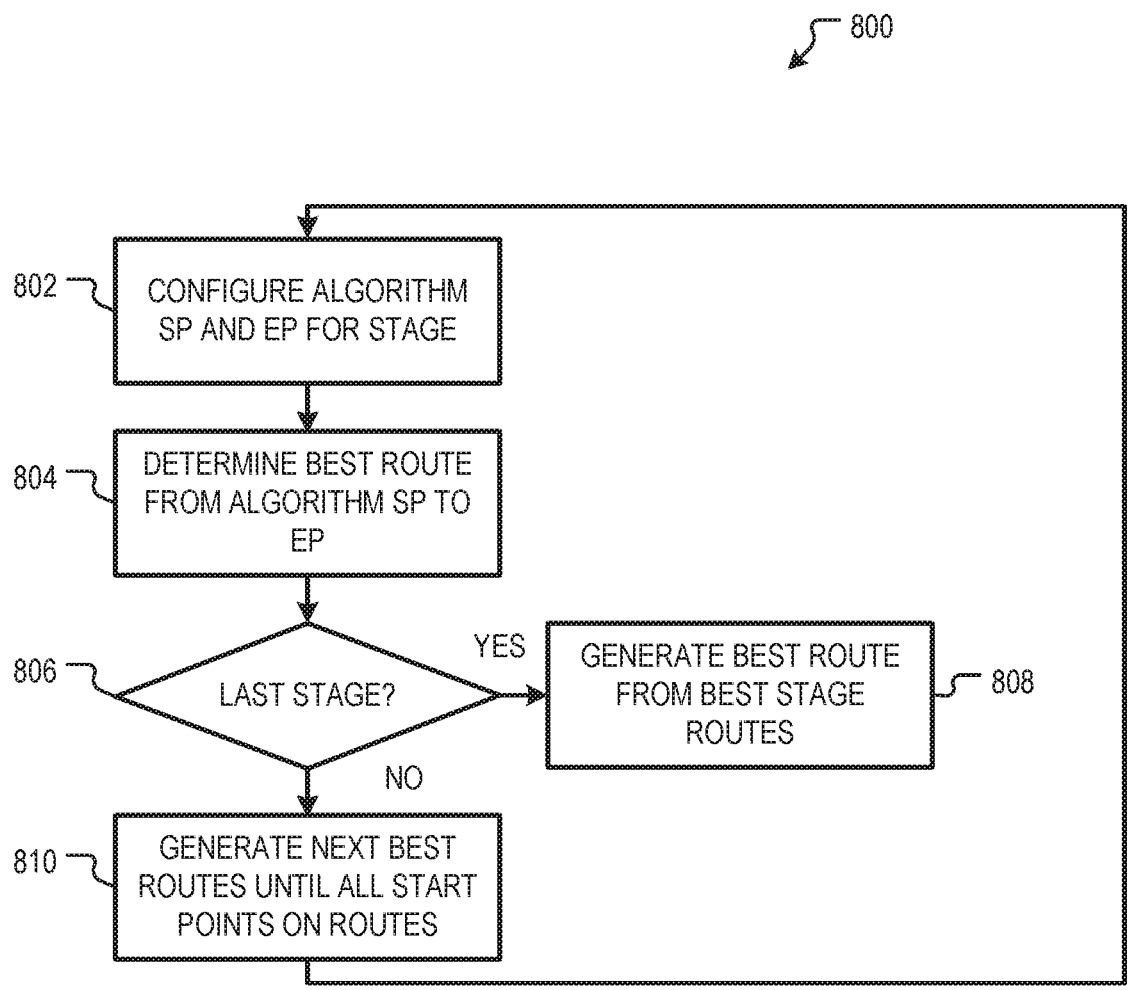
FIG. 8 is a flowchart showing one example of a process flow that can be executed by a vehicle autonomy system to generate a best route for the vehicle using multiple stages.

FIG. 8 is a flowchart showing one example of a process flow 800 that can be executed by a vehicle autonomy system (e.g., a navigator system thereof) to generate a best route for the vehicle using multiple stages. At operation 802, the vehicle autonomy system configures a first stage algorithm start point and a first stage algorithm end point. The first stage algorithm start point is coupled to a set of first stage start points such that the vehicle can traverse from the first stage algorithm start point to any of the first stage start point. Similarly, a first stage algorithm end point is coupled to a set of first stage end points such that the vehicle can traverse from any of the first stage end points to the first stage algorithm end points. Costs for traversing to or from the algorithm end points can be determined in any suitable manner.

The first stage start and end points can be selected, for example, based on the type of path planning algorithm used. For example, if the vehicle autonomy system uses an algorithm that begins from an end point, then the first stage start and end points can also begin from the end of the route. That is, the first stage end points may correspond to the candidate vehicle end points and the first stage start points can correspond to the last set of candidate waypoints. Similarly, if the vehicle autonomy system uses an algorithm that begins from a start point, then the first stage start and end points can also begin at the beginning of the route. That is, the first stage start points can correspond to the candidate vehicle start points and the first stage end points can correspond to the first set of candidate waypoints.

Figure 9:
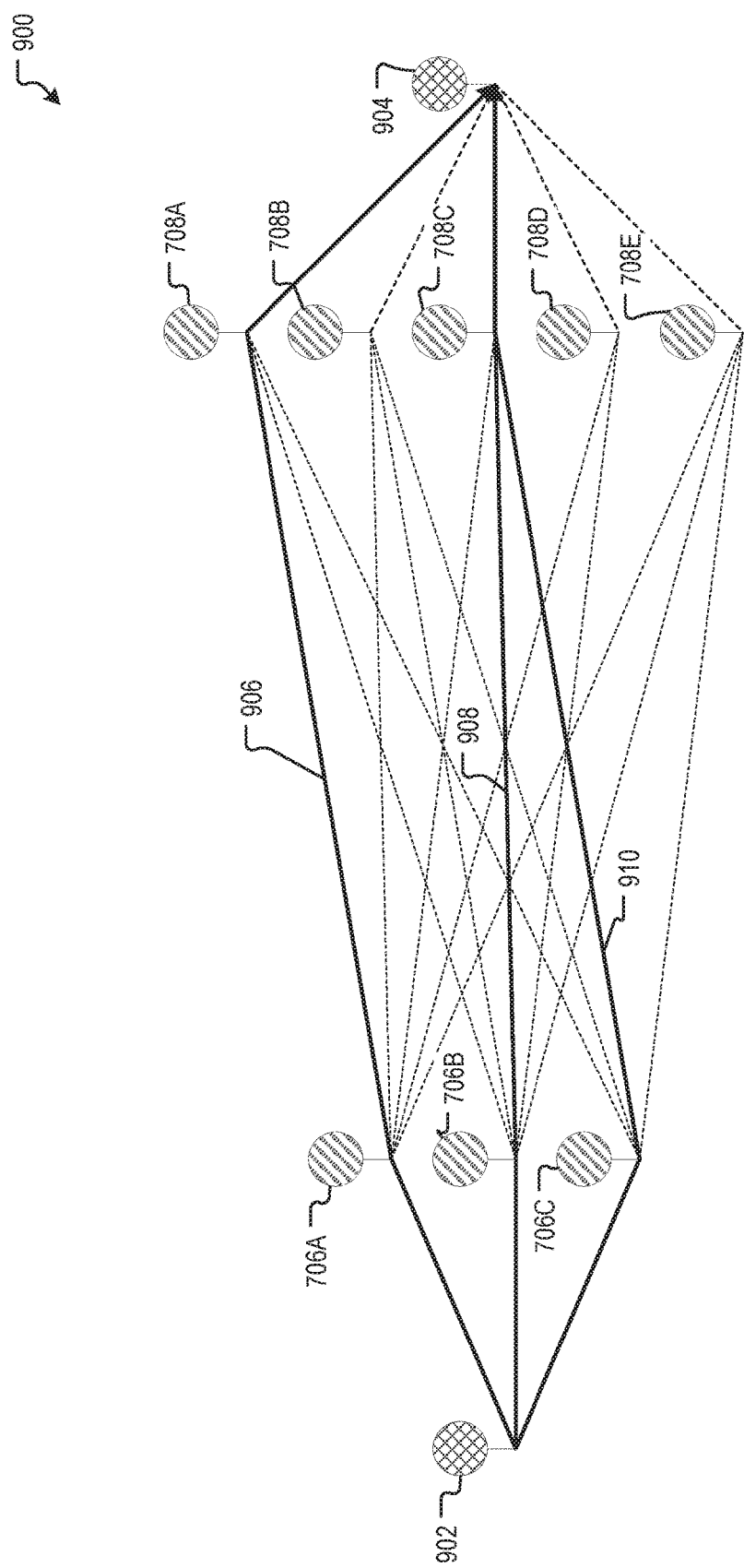
FIG. 9 shows the diagram representing a first stage of the path planning problem illustrated by FIG. 7 when solving with a path planning algorithm that operates from the end point.

FIG. 9 shows a diagram 900 representing a first stage of the path planning problem illustrated by the diagram 700 of FIG. 7 when solving with a path planning algorithm that operates from the end point. In the example of FIG. 9, the first stage end points are candidate vehicle end points 708A, 708B, 708C, 708D, 708E. The first stage start points are candidate waypoints 706A, 706B, 706C. The first stage algorithm start point 902 connects to candidate waypoints 706A, 706B, 706C. The first stage algorithm end point 904 connects the candidate vehicle end points 708A, 708B, 708C, 708D, 708E.

Referring back to FIG. 8, at operation 804, the vehicle autonomy system determines a best candidate route from the first stage algorithm start point to the first stage algorithm end point, for example, by applying a path planning algorithm. The best candidate route is the route having the lowest cost. The vehicle autonomy system can generate the best candidate route using a path planning algorithm, as described herein.

At operation 806, the vehicle autonomy system determines whether the current stage is the last stage. When using a path planning algorithm that begins from the end point, the last stage may be the stage in which the stage start points are the candidate vehicle start points. When using a path planning algorithm that begins from the start point, the last stage may be the stage in which the stage end points are the candidate vehicle end points. If the current stage is the last stage, then the vehicle autonomy system, at operation 808, generates the best route from the candidate routes determined at each stage, as described in more detail below.

If the current stage is not the last stage, the vehicle autonomy system, at operation 810, generates additional candidate routes between the first stage algorithm start point and the first stage algorithm end point. Additional candidate routes can be found using the path planning algorithm to find next-best routes (e.g., routes with higher costs than the best candidate route). Because finding the additional candidate routes involves applying the path planning algorithm is implemented to the same end point, state data generated while finding the best candidate route is re-usable to find the additional candidate routes. This can reduce the processing resources necessary to find the next best routes.

The vehicle autonomy system can continue to execute the path planning algorithm to generate candidate routes until it finds the best candidate route traversing each of the stage start points. The candidate routes may not be found consecutively. For example, the vehicle autonomy system may identify multiple next-best routes traversing a first path from the stage algorithm start point before finding any next-best routes traversing a second path.

Referring to the example of FIG. 9, this includes finding the best route that traverses from the stage algorithm start point 902 to the candidate waypoint 706A (e.g., candidate route 906), the best route that traverses from the algorithm start point 902 to the candidate way point 706B (e.g., candidate route 908), and the best route that traverses from the algorithm start point 902 to the candidate waypoint 706C (e.g., candidate route 910).

After finding the candidate routes, the process flow 800 returns to operation 802 to configure an algorithm start point and an algorithm end point for the next stage. In an example using a path planning algorithm that works from the end point, the previous stage end points are disregarded. The previous stage start points become the next stage end points and new algorithm start and end points are used. The costs for traversing from the next stage algorithm start point to the next stage start points can be determined in any suitable manner. Costs for traversing from the next stage end points to the next stage algorithm end point are based on the costs of the candidate routes from the previous stage.

Figure 10:
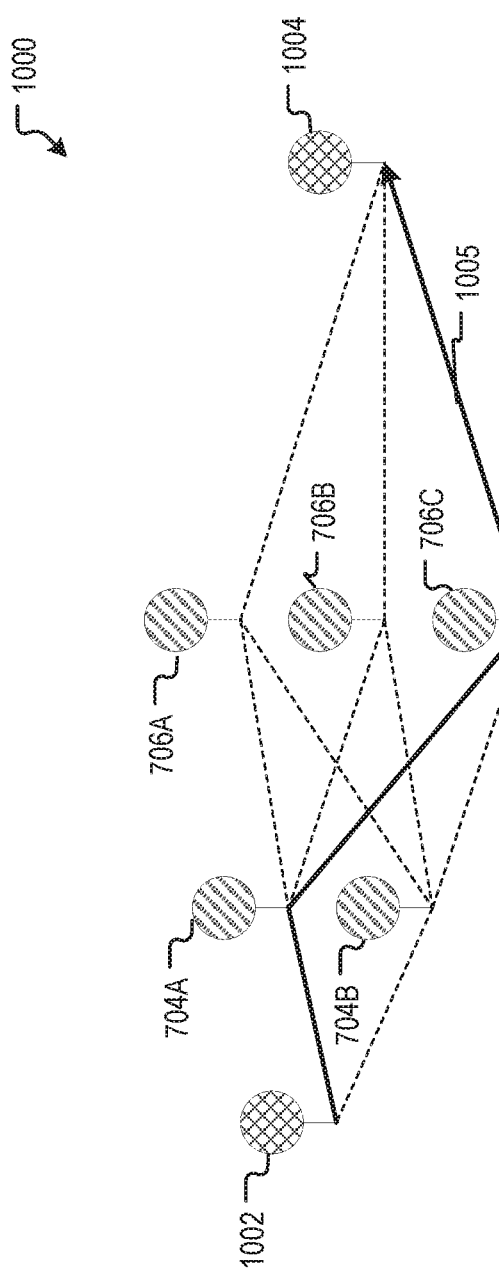
FIG. 10 shows the diagram representing a second stage of the path planning problem illustrated by the diagram of FIG. 7, again when solving with a path planning algorithm that operates from the end point.

An example second stage arrangement by the example of FIG. 10. FIG. 10 shows a diagram 1000 representing a second stage of the path planning problem illustrated by the diagram of FIG. 7, again when solving with a path planning algorithm that operates from the end point. Recall that in FIG. 9, the first stage start points were the set of candidate waypoints 706A, 706B, 706C and the first stage end points were the candidate vehicle end points 708A, 708B, 708C, 708D, 708E. In the example second stage of FIG. 10. The previous stage end points (e.g., candidate vehicle end points 708A, 708B, 708C, 708D, 708E) are disregarded. The previous stage start points (e.g., the set of candidate waypoints 706A, 706B, 706C) become the second stage end points. The second stage start points are the candidate vehicle start points 704A, 704B.

Costs for traversing from a second stage algorithm start point 1002 to the second stage start points (e.g., candidate vehicle start points 704A, 704B) can be determined in any suitable manner. Costs for traversing from the second stage end points (e.g., candidate waypoints 706A, 706B, 706C) to the second stage algorithm end point 1004 are based on the candidate routes 906, 908, 910 from the previous stage. For example, the cost for traversing from the candidate waypoint 706A is based on the cost of candidate route 906. The cost for traversing from the candidate waypoint 706B is based on the cost of candidate route 908. The cost for traversing from the candidate waypoint 706C is based on the cost of candidate route 910.

Referring back to FIG. 8, at operation 804, the vehicle autonomy system determines the best route between the second stage algorithm start point and the second stage algorithm end point. If, at operation 806, it is determined that the current stage is the last stage, the vehicle autonomy system determines an overall best route from the best route determined at operation 804 and one or more corresponding candidate routes from a previous stage or stages. For example, the portion of the best route between a current stage end point and the current stage algorithm end point is replaced by the portion of the corresponding candidate route from the previous stage that included the same point to find an overall best route.

This is illustrated again with reference to the example of FIGS. 7, 9, and 10, the diagram 1000 shown in 10 represents the last stage of the multi-stage path planning problem shown in FIG. 7. Accordingly, the vehicle autonomy system determines the best route 1005. Because the analysis is at the last stage, the vehicle autonomy system generates the overall best route from the best route 1005 and the candidate route or routes from previous stages. For example, the portion of the best route 1005 between the candidate waypoint best stage routes at operation 808. In the example of FIG. 10, the overall best route is found by replacing the portion of the route 1005 between the candidate waypoint 706C and the second stage algorithm end point is replaced with the portion of the candidate route 910 between the candidate way point 706C and the candidate vehicle end point 708C. This results in an overall best route 710, shown in FIG. 7.

Several examples described with respect to the process flow 800, including the examples of FIGS. 7, 9, and 10, use a path planning algorithm that operates from an end point. If a path planning algorithm is used that operates from a start point, the directions of the stages may be reversed, as described herein.

Figure 11:
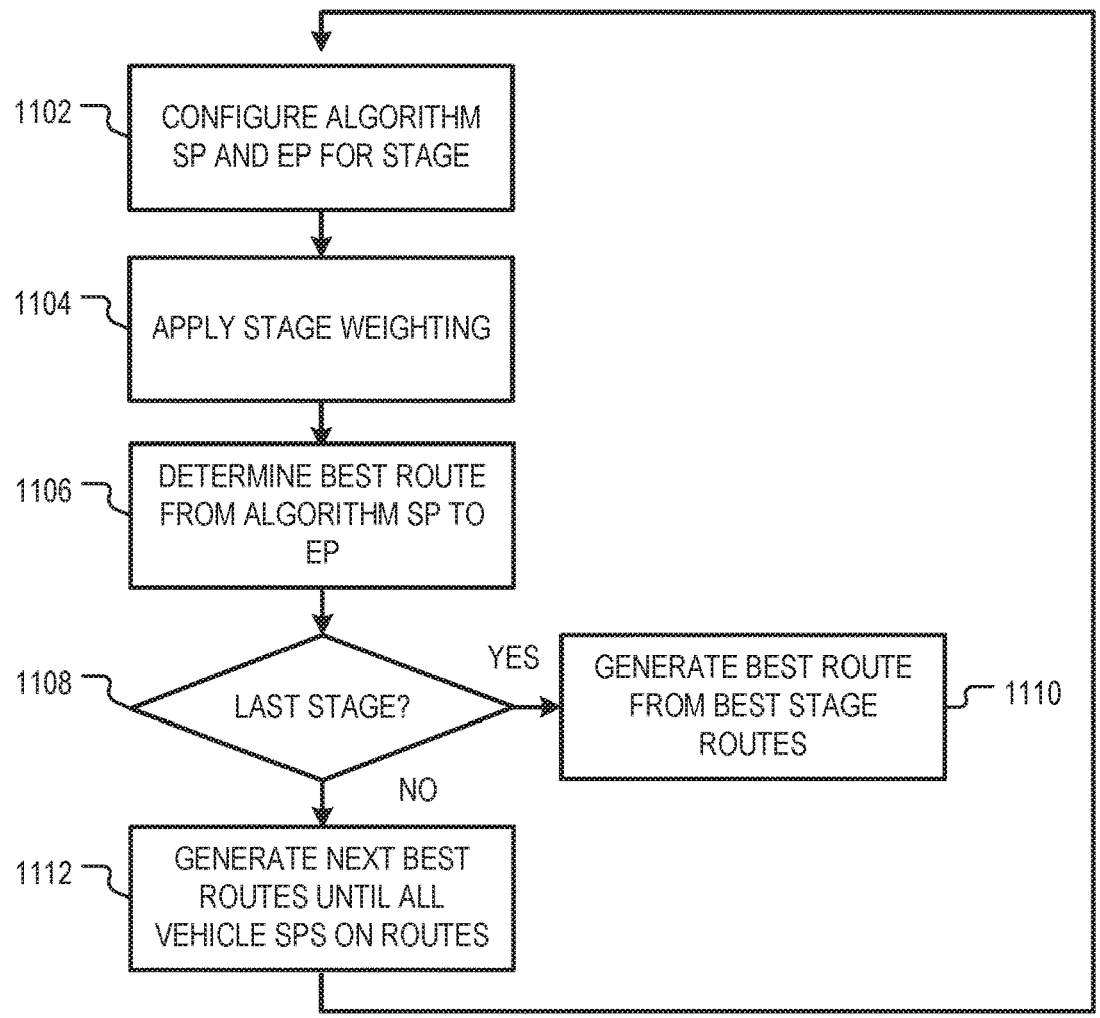
FIG. 11 is a flowchart showing one example of a process flow that can be executed by a vehicle autonomy system to generate a best route for a vehicle with stage weights.

FIG. 11 is a flowchart showing one example of a process flow 1100 that can be executed by a vehicle autonomy system (e.g., a navigator system thereof) to generate a best route for a vehicle with stage weights. At operation 1102, the vehicle autonomy system configures algorithm start points and end points for a first stage. At operation 1104, the vehicle autonomy system optionally applies stage weighting to the costs of route components considered during the stage. The weighting, if applied, can make the costs for route components more favorable (higher benefit, lower cost) or less favorable (lower benefit, higher costs). If the stage is to be optimized over other stages, then the costs for route components can be weighted to become less favorable. Similarly, if other stages are to be optimized over the current stage, then the costs for route components can be weighted to become more favorable.

At operation 1106, the vehicle autonomy system determines the best route from the stage algorithm start point to the stage algorithm end point. At operation 1108, the vehicle autonomy system determines if the current stage is the last stage. If so, then the vehicle autonomy system generates the best route from the best stage routes at operation 1110. If the current stage is not the last stage, the vehicle autonomy system generates the next best routes at operation 1112 and proceeds to the next stage at operation 1102.

Figure 12:
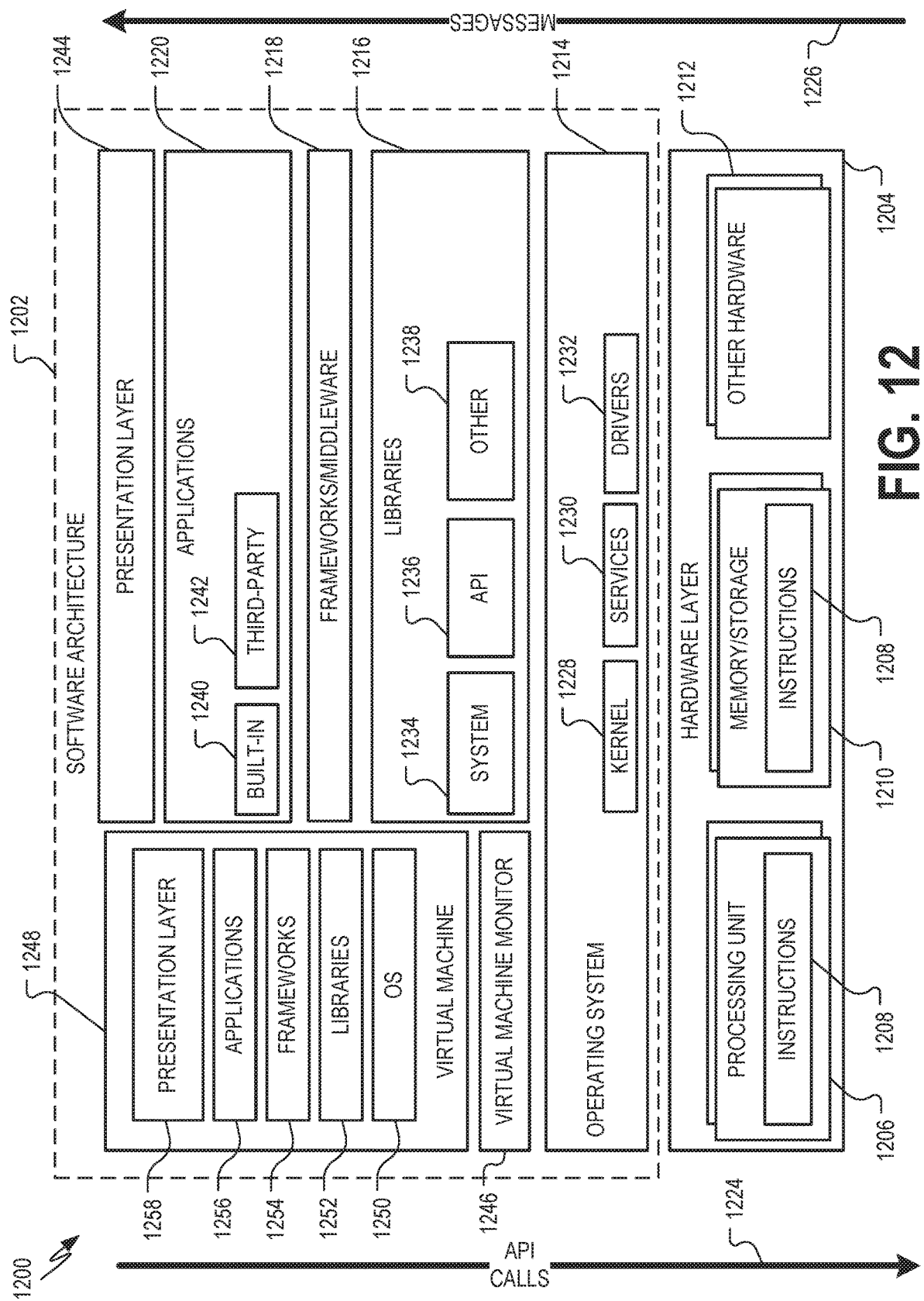
FIG. 12 is a block diagram showing one example of a software architecture for a computing device.

FIG. 12 is a block diagram 1200 showing one example of a software architecture 1202 for a computing device. The software architecture 1202 may be used in conjunction with various hardware architectures, for example, as described herein, FIG. 12 is merely a non-limiting example of a software architecture 1202 and many other architectures may be implemented to facilitate the functionality described herein. A representative hardware layer 1204 is illustrated and can represent, for example, any of the above-referenced computing devices. In some examples, the hardware layer 1204 may be implemented according to an architecture 1300 of FIG. 13 and/or the software architecture 1202 of FIG. 12.

The representative hardware layer 1204 comprises one or more processing units 1206 having associated executable instructions 1208. The executable instructions 1208 represent the executable instructions of the software architecture 1202, including implementation of the methods, modules, components, and so forth of FIGS. 1-10. The hardware layer 1204 also includes memory and/or storage modules 1210, which also have the executable instructions 1208. The hardware layer 1204 may also comprise other hardware 1212, which represents any other hardware of the hardware layer 1204, such as the other hardware illustrated as part of the architecture 1300.

In the example architecture of FIG. 12, the software architecture 1202 may be conceptualized as a stack of layers where each layer provides particular functionality. For example, the software architecture 1202 may include layers such as an operating system 1214, libraries 1216, frameworks/middleware 1218, applications 1220, and a presentation layer 1244. Operationally, the applications 1220 and/or other components within the layers may invoke API calls 1224 through the software stack and receive a response, returned values, and so forth illustrated as messages 1226 in response to the API calls 1224. The layers illustrated are representative in nature and not all software architectures have all layers. For example, some mobile or special-purpose operating systems may not provide a frameworks/middleware 1218 layer, while others may provide such a layer. Other software architectures may include additional or different layers.

The operating system 1214 may manage hardware resources and provide common services. The operating system 1214 may include, for example, a kernel 1228, services 1230, and drivers 1232. The kernel 8 may act as an abstraction layer between the hardware and the other software layers. For example, the kernel 1228 may be responsible for memory management, processor management (e.g., scheduling), component management, networking, security settings, and so on. The services 1230 may provide other common services for the other software layers. In some examples, the services 1230 include an interrupt service. The interrupt service may detect the receipt of a hardware or software interrupt and, in response, cause the software architecture 1202 to pause its current processing and execute an ISR when an interrupt is received. The ISR may generate an alert.

The drivers 1232 may be responsible for controlling or interfacing with the underlying hardware. For instance, the drivers 1232 may include display drivers, camera drivers. Bluetooth® drivers, flash memory drivers, serial communication drivers (e.g., Universal Serial Bus (USB) drivers), Wi-Fi® drivers, NFC drivers, audio drivers, power management drivers, and so forth depending on the hardware configuration.

The libraries 1216 may provide a common infrastructure that may be used by the applications 1220 and/or other components and/or layers. The libraries 1216 typically provide functionality that allows other software modules to perform tasks in an easier fashion than by interfacing directly with the underlying operating system 1214 functionality (e.g., kernel 1228, services 1230, and/or drivers 1232). The libraries 1216 may include system libraries 1234 (e.g., C standard library) that may provide functions such as memory allocation functions, string manipulation functions, mathematic functions, and the like. In addition, the libraries 1216 may include API libraries 1236 such as media libraries (e.g., libraries to support presentation and manipulation of various media formats such as MPEG4, H.264, MP3, AAC, AMR, JPG, and PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 1216 may also include a wide variety of other libraries 1238 to provide many other APIs to the applications 1220 and other software components/modules.

The frameworks 1218 (also sometimes referred to as middleware) may provide a higher-level common infrastructure that may be used by the applications 1220 and/or other software components/modules. For example, the frameworks 1218 may provide various graphical user interface (GUI) functions, high-level resource management, high-level location services, and so forth. The frameworks 1218 may provide a broad spectrum of other APIs that may be used by the applications 1220 and/or other software components/modules, some of which may be specific to a particular operating system or platform.

The applications 1220 include built-in applications 1240 and/or third-party applications 1242. Examples of representative built-in applications 1240 may include, but are not limited to, a contacts application, a browser application, a book reader application, a location application, a media application, a messaging application, and/or a game application. The third-party applications 1242 may include any of the built-in applications 1240 as well as a broad assortment of other applications. In a specific example, the third-party application 1242 (e.g., an application developed using the Android™ or iOS™ software development kit (SDK) by an entity other than the vendor of the particular platform) may be mobile software running on a mobile operating system such as iOS™, Android™, Windows® Phone, or other computing device operating systems. In this example, the third-party application 1242 may invoke the API calls 1224 provided by the mobile operating system such as the operating system 1214 to facilitate functionality described herein.

The applications 1220 may use built-in operating system functions (e.g., kernel 1228, services 1230, and/or drivers 1232), libraries (e.g., system libraries 1234, API libraries 1236, and other libraries 1238), or frameworks/middleware 1218 to create user interfaces to interact with users of the system. Alternatively, or additionally, in some systems, interactions with a user may occur through a presentation layer, such as the presentation layer 1244. In these systems, the application/module "logic" can be separated from the aspects of the application/module that interact with a user.

Some software architectures use virtual machines. For example, systems described herein may be executed using one or more virtual machines executed at one or more server computing machines. In the example of FIG. 12, this is illustrated by a virtual machine 1248. A virtual machine creates a software environment where applications/modules can execute as if they were executing on a hardware computing device. The virtual machine 1248 is hosted by a host operating system (e.g., the operating system 1214) and typically, although not always, has a virtual machine monitor 1246, which manages the operation of the virtual machine 1248 as well as the interface with the host operating system (e.g., the operating system 1214). A software architecture executes within the virtual machine 1248, such as an operating system 1250, libraries 1252, frameworks/middleware 1254, applications 1256, and/or a presentation layer 1258. These layers of software architecture executing within the virtual machine 1248 can be the same as corresponding layers previously described or may be different.

Figure 13:
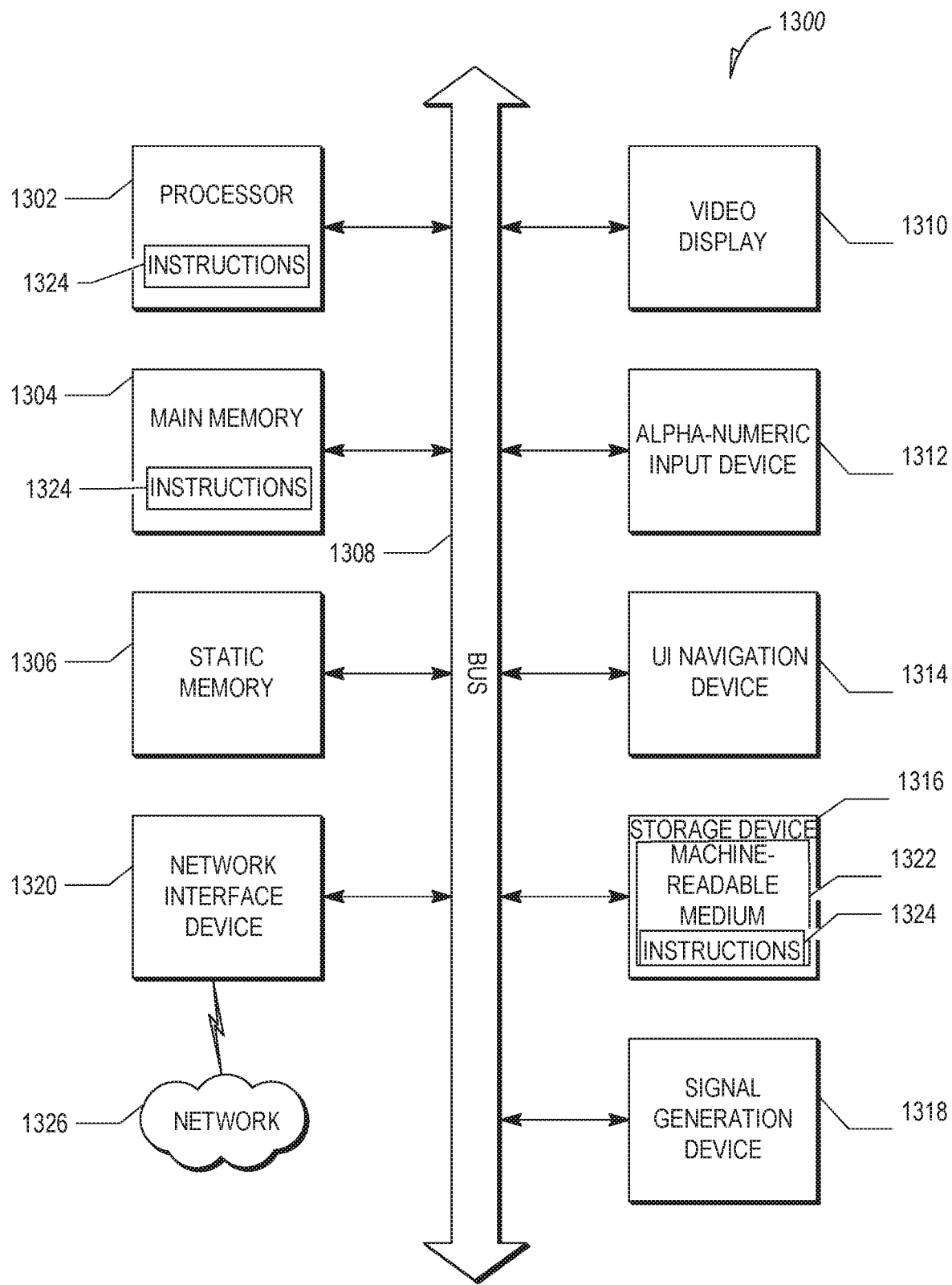
FIG. 13 is a block diagram illustrating a computing device hardware architecture.

FIG. 13 is a block diagram illustrating a computing device hardware architecture 1300, within which a set or sequence of instructions can be executed to cause a machine to perform examples of any one of the methodologies discussed herein. The hardware architecture 1300 describes a computing device for executing the vehicle autonomy system, described herein.

The architecture 1300 may operate as a standalone device or may be connected (e.g., networked) to other machines. In a networked deployment, the architecture 1300 may operate in the capacity of either a server or a client machine in server-client network environments, or it may act as a peer machine in peer-to-peer (or distributed) network environments. The architecture 1300 can be implemented in a personal computer (PC), a tablet PC, a hybrid tablet, a set-top box (STB), a personal digital assistant (PDA), a mobile telephone, a web appliance, a network router, a network switch, a network bridge, or any machine capable of executing instructions (sequential or otherwise) that specify operations to be taken by that machine.

The example architecture 1300 includes a processor unit 1302 comprising at least one processor (e.g., a central processing unit (CPU), a graphics processing unit (GPU), or both, processor cores, compute nodes). The architecture 1300 may further comprise a main memory 1304 and a static memory 1306, which communicate with each other via a link 1308 (e.g., bus). The architecture 1300 can further include a video display unit 1310, an input device 1312 (e.g., a keyboard), and a UI navigation device 1314 (e.g., a mouse). In some examples, the video display unit 1310, input device 1312, and UI navigation device 1314 are incorporated into a touchscreen display. The architecture 1300 may additionally include a storage device 1316 (e.g., a drive unit), a signal generation device 1318 (e.g., a speaker), a network interface device 1320, and one or more sensors (not shown), such as a Global Positioning System (GPS) sensor, compass, accelerometer, or other sensor.

In some examples, the processor unit 1302 or another suitable hardware component may support a hardware interrupt. In response to a hardware interrupt, the processor unit 1302 may pause its processing and execute an ISR, for example, as described herein.

The storage device 1316 includes a machine-readable medium 1322 on which is stored one or more sets of data structures and instructions 1324 (e.g., software) embodying or used by any one or more of the methodologies or functions described herein. The instructions 1324 can also reside, completely or at least partially, within the main memory 1304, within the static memory 1306, and/or within the processor unit 1302 during execution thereof by the architecture 1300, with the main memory 1304, the static memory 1306, and the processor unit 1302 also constituting machine-readable media.

Executable Instructions and Machine-Storage Medium

The various memories (i.e., 1304, 1306, and/or memory of the processor unit(s) 1302) and/or storage device 1316 may store one or more sets of instructions and data structures (e.g., instructions) 1324 embodying or used by any one or more of the methodologies or functions described herein. These instructions, when executed by processor unit(s) 1302 cause various operations to implement the disclosed examples.

As used herein, the terms "machine-storage medium," "device-storage medium," "computer-storage medium" (referred to collectively as "machine-storage medium 1322") mean the same thing and may be used interchangeably in this disclosure. The terms refer to a single or multiple storage devices and/or media (e.g., a centralized or distributed database, and/or associated caches and servers) that store executable instructions and/or data, as well as cloud-based storage systems or storage networks that include multiple storage apparatus or devices. The terms shall accordingly be taken to include, but not be limited to, solid-state memories, and optical and magnetic media, including memory internal or external to processors. Specific examples of machine-storage media, computer-storage media, and/or device-storage media 1322 include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms machine-storage media, computer-storage media, and device-storage media 1322 specifically exclude carrier waves, modulated data signals, and other such media, at least some of which are covered under the term "signal medium" discussed below.

Signal Medium

The term "signal medium" or "transmission medium" shall be taken to include any form of modulated data signal, carrier wave, and so forth. The term "modulated data signal" means a signal that has one or more of its characteristics set or changed in such a matter as to encode information in the signal.

Computer-Readable Medium

The terms "machine-readable medium," "computer-readable medium" and "device-readable medium" mean the same thing and may be used interchangeably in this disclosure. The terms are defined to include both machine-storage media and signal media. Thus, the terms include both storage devices/media and carrier waves/modulated data signals.

The instructions 1324 can further be transmitted or received over a communications network 1326 using a transmission medium via the network interface device 1320 using any one of a number of well-known transfer protocols (e.g., HTTP). Examples of communication networks include a LAN, a WAN, the Internet, mobile telephone networks, plain old telephone service (POTS) networks, and wireless data networks (e.g., 3G, 4G LTE/LTE-A, 5G or WiMAX networks). The term "transmission medium" shall be taken to include any intangible medium that is capable of storing, encoding, or carrying instructions for execution by the machine, and includes digital or analog communications signals or other intangible media to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Various components are described in the present disclosure as being configured in a particular way. A component may be configured in any suitable manner. For example, a component that is or that includes a computing device may be configured with suitable software instructions that program the computing device. A component may also be configured by virtue of its hardware arrangement or in any other suitable manner.

The above description is intended to be illustrative, and not restrictive. For example, the above-described examples (or one or more aspects thereof) can be used in combination with others. Other examples can be used, such as by one of ordinary skill in the art upon reviewing the above description. The Abstract is to allow the reader to quickly ascertain the nature of the technical disclosure, for example, to comply with 37 C.F.R. § 1.72(b) in the United States of America. It is submitted with the understanding that it will not be used to interpret or limit the scope or meaning of the claims.

Also, in the above Detailed Description, various features can be grouped together to streamline the disclosure. However, the claims cannot set forth every feature disclosed herein, as examples can feature a subset of said features. Further, examples can include fewer features than those disclosed in a particular example. Thus, the following claims are hereby incorporated into the Detailed Description, with each claim standing on its own as a separate example. The scope of the examples disclosed herein is to be determined with reference to the appended claims, along with the full scope of equivalents to which such claims are entitled,

The invention claimed is:

1. An autonomous vehicle system comprising:
   at least one processor; and
   a storage device storing instructions that, when executed by the at least one processor, causes the at least one processor to perform operations comprising:
   accessing trip plan data describing a plurality of candidate vehicle start points, a plurality of candidate waypoints, and a plurality of candidate vehicle end points;
   determining a plurality of candidate routes between an algorithm start point and an algorithm end point, wherein each candidate route of the plurality of candidate routes includes at least one of the plurality of candidate waypoints and at least one of the plurality of candidate vehicle end points, the determining of the plurality of candidate routes comprising:
   determining a first candidate route of the plurality of candidate routes;
   storing state data generated from the determining of the first candidate route; and
   generating a second candidate route of the plurality of candidate routes using the state data;
   selecting a route from the plurality of candidate routes, the selected route including a first candidate vehicle start point, a first candidate waypoint, and a first candidate vehicle end point; and
   controlling an autonomous vehicle along the selected route from the first candidate vehicle start point towards the first candidate vehicle end point.

2. The system of claim 1, wherein the first candidate vehicle start point is a current location of the autonomous vehicle.

3. The system of claim 1, wherein determining the selected route comprises determining a selected route between a second stage algorithm start point and a second stage algorithm end point.

4. The system of claim 1, wherein the storage device further stores instructions that, when executed by the at least one processor, causes the at least one processor to perform operations comprising, before determining the selected route, modifying weightings for a plurality of route component costs associated with points prior to the plurality of candidate vehicle start points.

5. The system of claim 1, wherein the first candidate vehicle start point corresponds to a first geographic location and wherein the algorithm start point is non-geographic.

6. The system of claim 1, wherein the storage device further stores instructions that, when executed by the at least one processor, causes the at least one processor to perform operations comprising:
  accessing a first route component cost between the first candidate vehicle start point and a second point, wherein the first route component cost is based at least in part on an estimated driving time between the first candidate vehicle start point and the second point; and
  accessing a second route component cost between the algorithm start point and the first candidate vehicle start point, wherein second route component cost is based at least in part on a cost to move an autonomous vehicle payload to the first candidate vehicle start point, and wherein the determining of the plurality of candidate routes is based at least in part on the first route component cost and the second route component cost.

7. The system of claim 1, wherein determining the selected route comprises determining a selected route between a second stage algorithm start point and a second stage algorithm end point, wherein the selected route between the second stage algorithm start point and the second stage algorithm end point comprises a first waypoint of the plurality of candidate waypoints.

8. The system of claim 7, wherein the selecting of the selected route further comprises substituting a portion of the selected route between the second stage algorithm start point and the second stage algorithm end point into a first candidate route of the plurality of candidate routes.

9. A method of navigating an autonomous vehicle, comprising:
  accessing trip plan data describing a plurality of candidate vehicle start points, a plurality of candidate waypoints, and a plurality of candidate vehicle end points;
  determining a plurality of candidate routes between an algorithm start point and an algorithm end point, wherein each candidate route of the plurality of candidate routes includes at least one of the plurality of candidate waypoints and at least one of the plurality of candidate vehicle end points, the determining of the plurality of candidate routes comprising:
    determining a first candidate route of the plurality of candidate routes;
    storing state data generated from the determining of the first candidate route; and
    generating a second candidate route of the plurality of candidate routes using the state data;
  selecting a route from the plurality of candidate routes, the selected route including a first candidate vehicle start point, a first candidate waypoint, and a first candidate vehicle end point; and
  controlling the autonomous vehicle along the selected route from the first candidate vehicle start point towards the first candidate vehicle end point.

10. The method of claim 9, wherein the first candidate vehicle start point is a current location of the autonomous vehicle.

11. The method of claim 9, wherein determining the selected route comprises determining a selected route between a second stage algorithm start point and a second stage algorithm end point.

12. The method of claim 9, further comprising, before determining the selected route, modifying weightings for a plurality of route component costs associated with points prior to the plurality of candidate vehicle start points.

13. The method of claim 9, wherein the first candidate vehicle start point corresponds to a first geographic location and wherein the algorithm start point is non-geographic.

14. The method of claim 9, further comprising:
  accessing a first route component cost between the first candidate vehicle start point and a second point, wherein the first route component cost is based at least in part on an estimated driving time between the first candidate vehicle start point and the second point; and
  accessing a second route component cost between the algorithm start point and the first candidate vehicle start point, wherein second route component cost is based at least in part on a cost to move an autonomous vehicle payload to the first candidate vehicle start point, and wherein the determining of the plurality of candidate routes is based at least in part on the first route component cost and the second route component cost.

15. The method of claim 9, wherein determining the selected route comprises determining a selected route between a second stage algorithm start point and a second stage algorithm end point, wherein selected route between the second stage algorithm start point and the second stage algorithm end point comprises a first waypoint of the plurality of candidate waypoints.

16. The method of claim 15, wherein determining the selected route further comprises substituting a portion of the selected route between the second stage algorithm start point and the second stage algorithm end point into a first candidate route of the plurality of candidate routes.

17. A method of navigating an autonomous vehicle, comprising:
  accessing trip plan data describing a directed route comprising a plurality of route components;
  selecting a route to an algorithm end point, wherein the selected route proceeds from a first route component of the plurality of route components to the algorithm end point;
  controlling the autonomous vehicle along the selected route towards the first route component; and
  controlling the autonomous vehicle along the directed route from the first route component.

18. The method of claim 17, wherein determining the selected route to the algorithm end point comprises determining the selected route from an algorithm start point to the algorithm end point.

* * * * *